United States Patent [19]
Bessho et al.

[11] Patent Number: 5,982,521
[45] Date of Patent: Nov. 9, 1999

[54] OPTICAL SCANNER

[75] Inventors: Yoshinori Bessho, Mie-ken; Takeshi Asano, Toyoake; Yasunori Kobayashi, Nagoya, all of Japan

[73] Assignee: Brother Kogyo Kabushiki Kaisha, Nagoya, Japan

[21] Appl. No.: 08/751,077

[22] Filed: Nov. 15, 1996

[30] Foreign Application Priority Data

| Nov. 15, 1995 | [JP] | Japan | 7-296788 |
| Feb. 8, 1996 | [JP] | Japan | 8-22618 |
| Feb. 8, 1996 | [JP] | Japan | 8-22620 |
| Feb. 20, 1996 | [JP] | Japan | 8-31922 |
| Feb. 28, 1996 | [JP] | Japan | 8-41361 |
| Mar. 4, 1996 | [JP] | Japan | 8-46134 |
| May 9, 1996 | [JP] | Japan | 8-114581 |
| May 14, 1996 | [JP] | Japan | 8-118796 |

[51] Int. Cl.⁶ ................................................. G02B 26/08
[52] U.S. Cl. .......................... 359/198; 359/214; 359/224; 347/260
[58] Field of Search ..................... 359/196, 197, 359/198, 199, 213, 214, 221, 224; 347/243, 260

[56] References Cited

U.S. PATENT DOCUMENTS

| 5,221,933 | 6/1993 | Chandler et al. . |
| 5,268,784 | 12/1993 | Chaya ........................ 359/224 |
| 5,280,377 | 1/1994 | Chandler et al. . |
| 5,486,944 | 1/1996 | Bard et al. ................... 359/198 |

FOREIGN PATENT DOCUMENTS

| A-5-249402 | 9/1993 | Japan . |
| A-5-264917 | 10/1993 | Japan . |

*Primary Examiner*—Thong Nguyen
*Assistant Examiner*—Darren E. Schuberg
*Attorney, Agent, or Firm*—Oliff & Berridge, PLC

[57] ABSTRACT

A magnet is integrally formed with a mirror surface for reflecting off a laser beam. A torsion spring holds the magnet thereon. The torsion spring is made of a shape-memory alloy. A coil generates an alternating magnetic field so as to oscillate the magnet about the torsion spring. The oscillating magnet scans the light beam.

35 Claims, 31 Drawing Sheets

FIG. 6

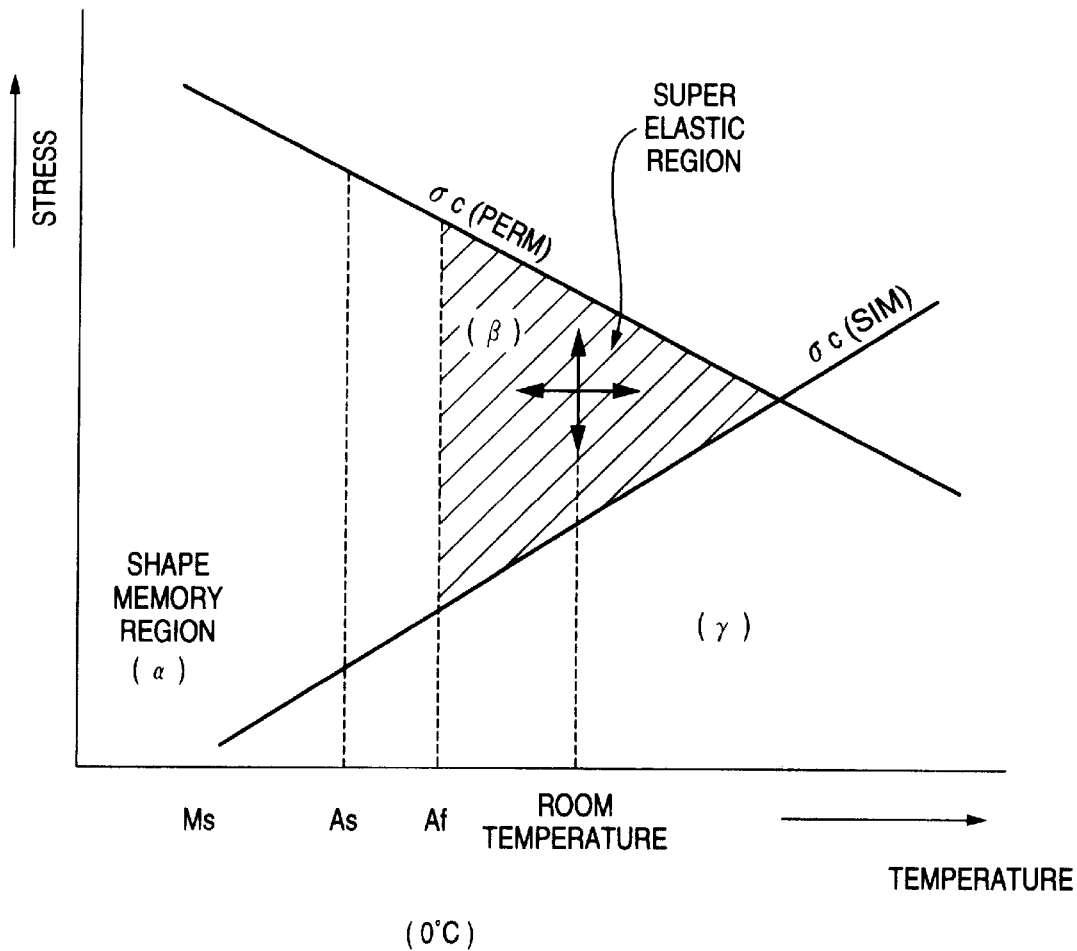

- Ms : MARTENSITIC PHASE TRANSFORMATION START TEMPERATURE
- As : REVERSE TRANSFORMATION START TEMPERATURE
- Af : REVERSE TRANSFORMATION COMPLETION TEMPERATURE
- $\sigma c$ (PERM) : PERMANENT DEFORMATION CRITICAL STRESS
- $\sigma c$ (SIM) : STRESS-INDUCED TRANSFORMATION CRITICAL STRESS
- $\alpha$ : MARTENSITIC PHASE
- $\beta$ : STRESS-INDUCED MARTENSITIC PHASE
- $\gamma$ : ORIGINAL PHASE ( ANSTENITIC PHASE )
- ↕ : RESONANT OSCILLATION ACTIVATION REGION T : ROOM TEMPERATURE
Af : AUSTENITIC TRANSFORMATION (REVERSE TRANSFORMATION) COMPLETION POINT

① AUSTENTIC PHASE    ②, ③ MARTENSITIC PHASE

FIG. 11

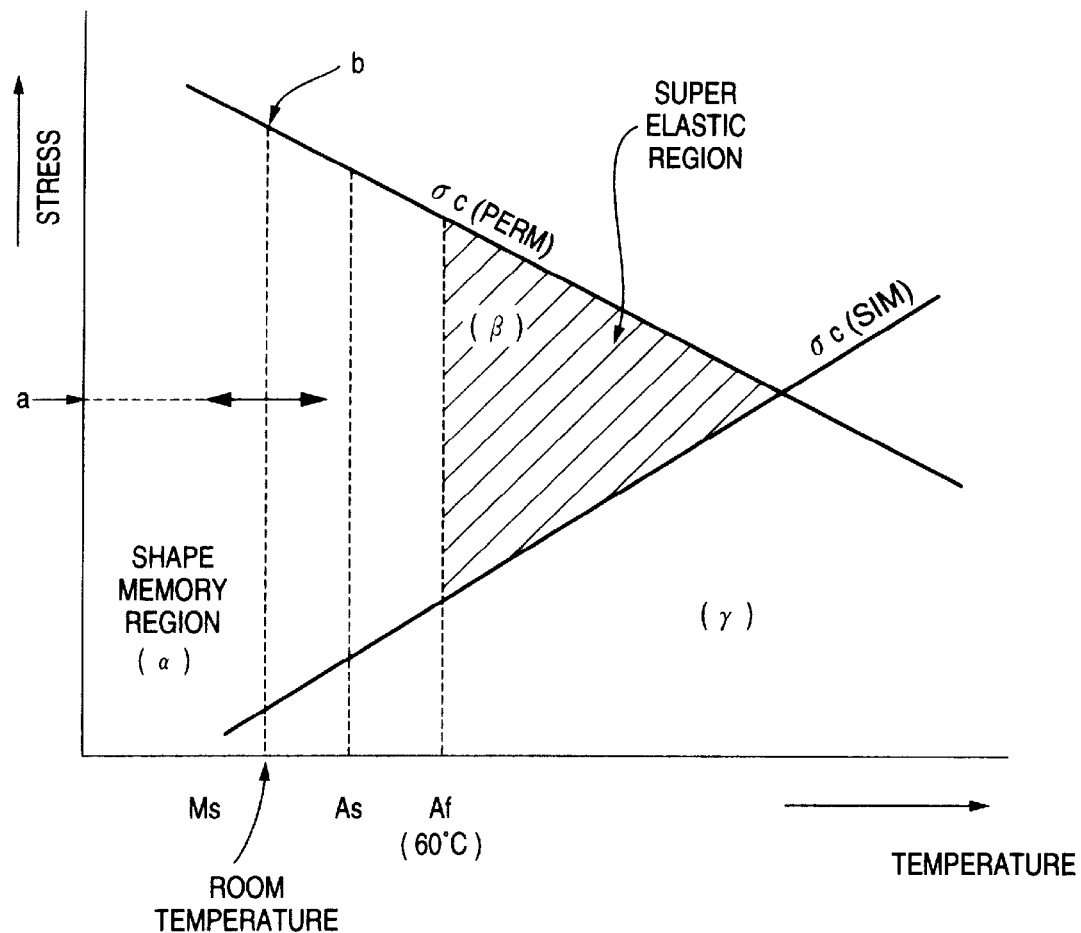

Ms : MARTENSITIC PHASE TRANSFORMATION START TEMPERATURE
As : REVERSE TRANSFORMATION START TEMPERATURE
Af : REVERSE TRANSFORMATION COMPLETION TEMPERATURE
$\sigma c$ (PERM) : PERMANENT DEFORMATION CRITICAL STRESS
$\sigma c$ (SIM) : STRESS-INDUCED TRANSFORMATION CRITICAL STRESS
$\alpha$ : MARTENSITIC PHASE
$\beta$ : STRESS-INDUCED MARTENSITIC PHASE
$\gamma$ : ORIGINAL PHASE ( ANSTENITIC PHASE )
$\updownarrow$ : RESONANT OSCILLATION ACTIVATION REGION

OPTICAL SCANNER

BACKGROUND OF THE INVENTION

1. Field of the Invention

The present invention relates to an optical scanner used in a laser printer, a bar code reader, a laser scan micrometer, and the like.

2. Description of the Related Art

U.S. Pat. Nos. 5,221,933 and 5,280,377 disclose an optical scanner provided with a mirror-mounted magnet. The optical scanner is also provided with a coil for generating an alternating magnetic field.

According to U.S. Pat. No. 5,221,933, a driving magnet 62 is connected via an adhesive to a mirror 60 as shown in FIG. 1. The mirror 60 is supported by a pair of leaf sprints 70 via magnet inserts 78. A driving coil 64 is provided surrounding the driving magnet 62. When an alternating current flows in the coil 64, an alternating magnetic field is produced around the coil 64. The alternating magnetic field applies a torque to the driving magnet 62, whereby the magnet 62 and the mirror 60 attached to the magnet 62 angularly oscillate in a non-resonant mode. Light reflected off the mirror 60 is scanned in a direction orthogonal to the axis about which the mirror 60 oscillates.

SUMMARY OF THE INVENTION

The above-described conventional optical scanner is thus constructed from a number of parts. The optical scanner therefore has a complicated structure. The optical scanner has a large mass and a large moment of inertia. It is necessary to supply the coil 64 with an electric current of an amount large enough to oscillate the mirror 60 and the magnet 62. A large amount of electric power is required. With this structure, the mirror 60 and the coil 64 can oscillate with a frequency of 50 to 120 Hz at maximum. The optical scanner may not be provided in a laser printer or an image scanner which requires to scan light at a frequency as high as 800 Hz.

Additionally, the specific structure of the leaf springs 78 fail to deform the mirror 60 at a sufficiently large deforming angle. The optical scanner can therefore scan a 35 mm film at maximum. The optical scanner may not be applied to optical scanning devices such as a laser printer.

It is therefore, an object of the present invention to overcome the above-described drawbacks, and to provide an improved optical scanner which can scan light at a sufficiently high frequency over a large scanning width, which is compact and light, and which is inexpensive.

In order to attain these and other objects, the present invention provides an optical scanner for scanning a light beam, the optical scanner comprising: a magnet member provided with a mirror surface for reflecting off a light beam; a torsion spring for supporting the magnet member thereon and for being capable of twisting about its axis; and magnetic field generating means for generating an alternating magnetic field, which causes the magnet member to angularly oscillate about the axis of the torsion spring and the torsion spring to twist about the axis, whereby the mirror provided to the magnet member scans the light beam.

The torsion spring may preferably be formed from a material having an elasticity. The torsion spring may be subjected to a surface treatment so as to have an improved fatigue limit. The torsion spring may be made from an alloy capable of presenting a super elasticity. The torsion spring may be made from a shape-memory alloy.

According to another aspect, the present invention provides a method of producing a torsion spring for being supported by a supporting member and for holding a magnet provided with a mirror, the method comprising the steps of: preparing a thin plate of elasticity; providing a resist layer on the thin plate, the resist layer having a shape corresponding to a planar shape of the torsion spring; and performing an electropolishing process with the thin plate provided with the resist layer so that the thin plate will be dissolved at a portion not provided with the resist layer.

BRIEF DESCRIPTION OF THE DRAWINGS

The above and other objects, features and advantages of the invention will become more apparent from reading the following description of the preferred embodiment taken in connection with the accompanying drawings in which:

FIG. 6 is a graph showing how a phase transformation is occurred in a shape-memory alloy in accordance with an ambient temperature and in accordance with a stress applied to the shape-memory alloy where the shape-memory alloy has a reverse transformation point Af lower than a room temperature;

FIG. 11 is a graph showing how a phase transformation is occurred in the shape-memory alloy in accordance with an ambient temperature and in accordance with a stress applied to the shape-memory alloy where the shape-memory alloy has a reverse transformation point Af higher than a room temperature;

FIG. 34($b$) shows how the Ni—Ti alloy plate with the resist layer is immersed in a bath;

FIG. 34($c$) shows how the Ni—Ti alloy plate remains only at the portion where the resist layer is provided;

DETAILED DESCRIPTION OF THE PREFERRED EMBODIMENTS

Figure 1:
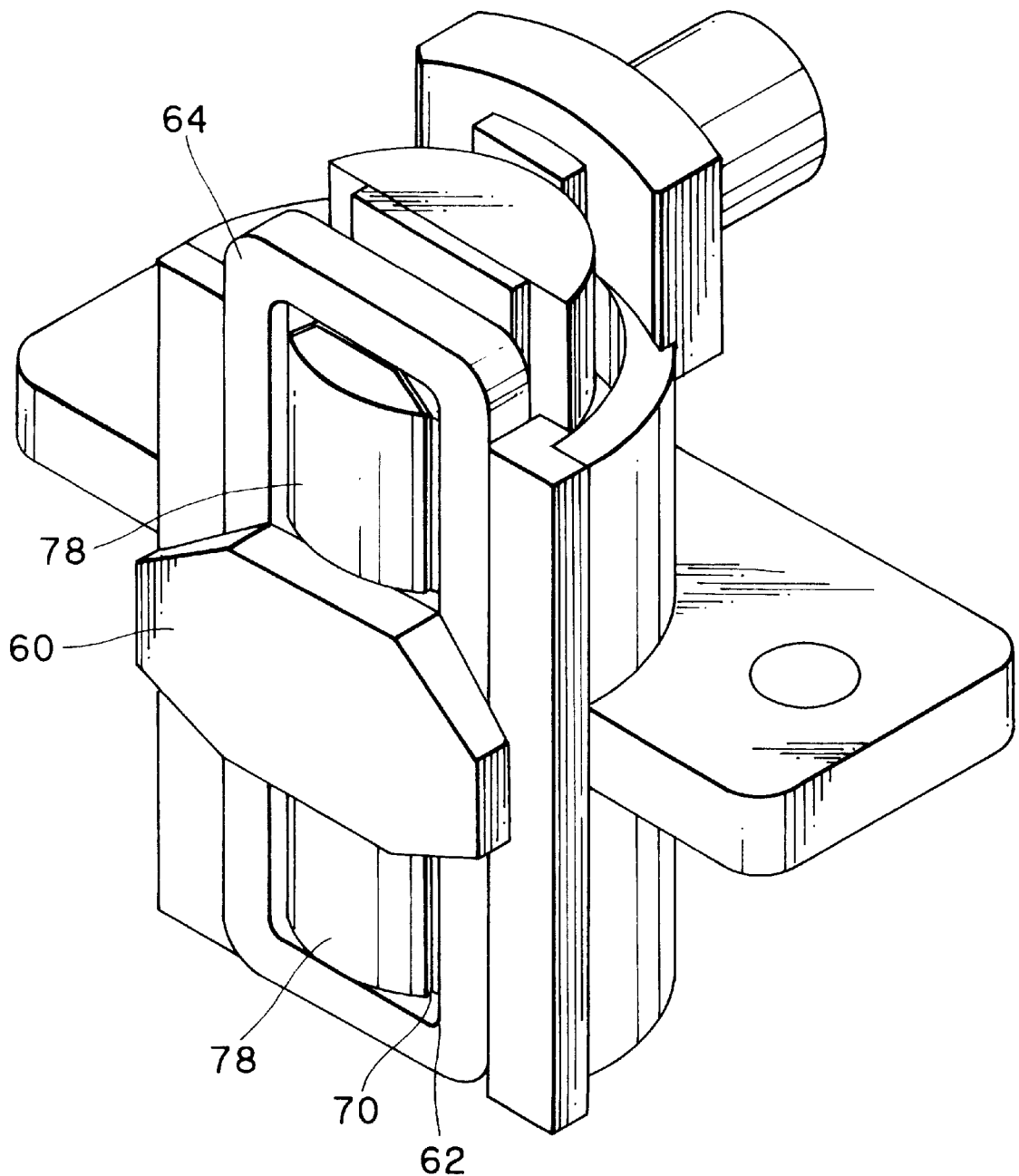
FIG. 1 is a perspective view showing a conventional optical scanner.

An optical scanner according to preferred embodiments of the present invention will be described below with reference to the accompanying drawings in which the same components are designated by the same reference numerals to avoid duplicating description.

A first preferred embodiment of the present invention will be described below while referring to FIGS. 2 through 10.

Figure 2:
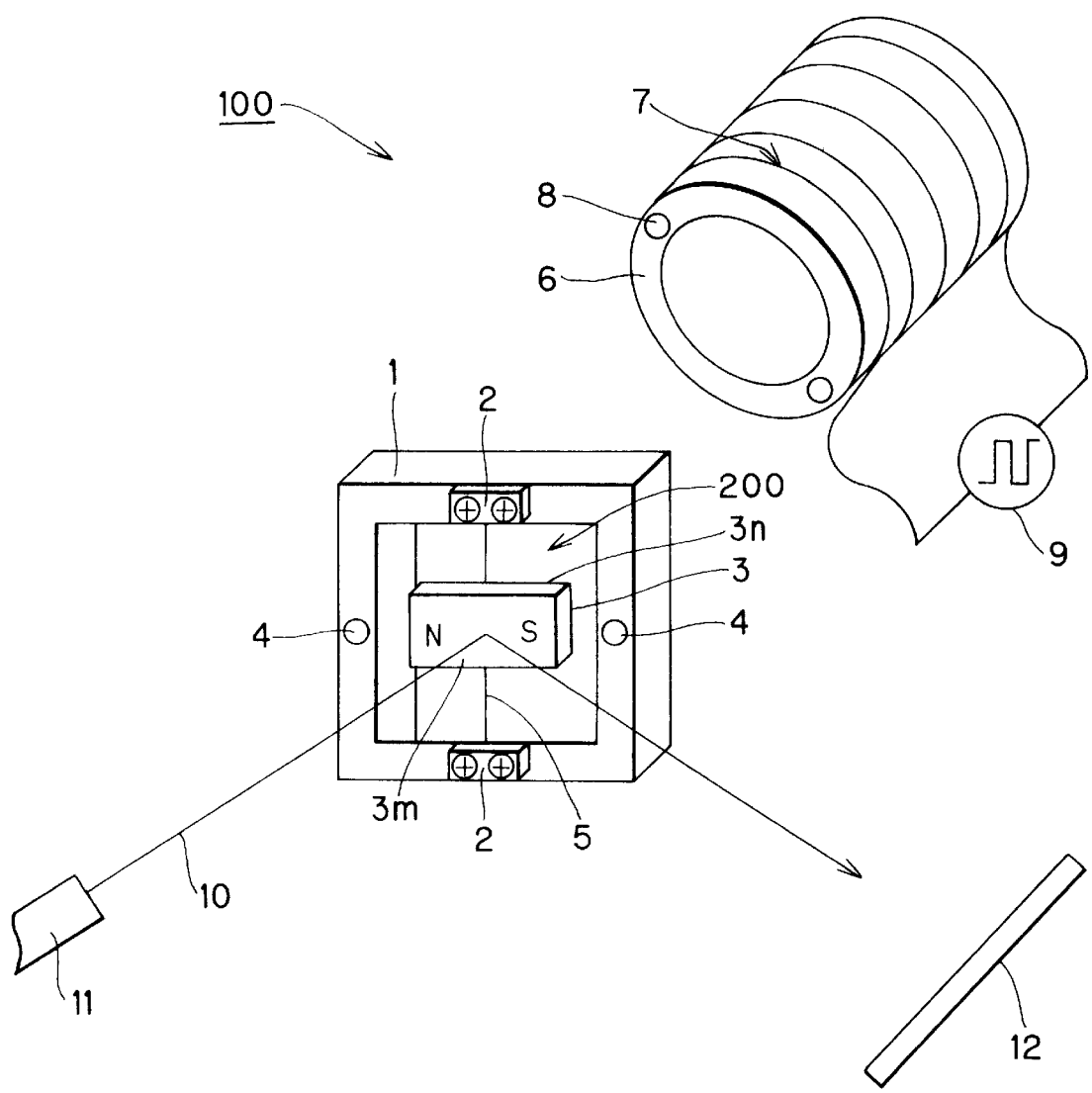
FIG. 2 is a perspective view showing an optical scanner of a first embodiment according to the present invention where a frame and a coil are separated from each other.

FIG. 2 shows a structure of an optical scanner 100 of the first embodiment.

The optical scanner 100 has a rectangular-shaped frame 1. A wire-shaped torsion spring 5 is stretched between upper and lower sides of the frame 1. A small magnet 3 is attached to substantially the central portion of the torsion spring 5 along its longitudinal axis. The frame 1 is fixedly secured to a coil 7. The coil 7 is for producing an alternating magnetic field. The torsion spring 5 and the magnet 3 constitutes an oscillating system 200 which angularly oscillates about the longitudinal axis of the torsion spring 5 in accordance with the alternating magnetic field.

The frame 1 is made of a non-magnetic metal material such as an aluminum alloy and an austenitic stainless steel. The frame 1 has a rectangular-shape constructed from four sides (upper, lower, right, and left sides). Each of the right and left sides is formed with a tiny through-hole 4.

The torsion spring 5 is strung between the upper and lower sides to extend vertically. That is, upper and lower ends of the torsion spring 5 are fixedly secured to the upper and lower sides of the frame 1 with a pair of jigs 2. The jigs 2 are made from an aluminum alloy, for example.

The torsion spring 5 is made of elastic material. For example, the torsion spring 5 is made of a shape-memory alloy such as a Ni—Ti alloy. The torsion spring 5 is of a wire shape having a substantially circular cross-section with a diameter in a range of about 100 to 500 micrometers. In this example, the torsion spring 5 has a diameter of 140 micrometers. The torsion spring 5 has a length of about 10 mm along its longitudinal axis.

The magnet 3 is attached to substantially a central portion of the torsion spring 5 along its length. The magnet 3 is therefore located in substantially the center of the frame 1.

The magnet 3 is of a plate shape with two opposite surfaces 3$m$ and 3$n$. The magnet 3 is attached to the torsion spring 5 at its surface 3$n$. The other surface 3$m$ is mirror-polished so as to be capable of reflecting off a laser beam. It is noted that the surface 3$m$ may not be mirror-polished, but a mirror is attached via an adhesive to the surface 3$m$.

For example, the magnet 3 has a vertical width of 3 mm, a horizontal length of 6 mm, and a thickness of 0.3 mm. The magnet 3 is made of nickel cobalt (Ni—Co), samarium cobalt (Sm—Co), or neodymium iron (Nd—Fe) plated with nickel for rust prevention. The magnet 3 has a residual flux density of about 10,000 gausses. The magnet 3 may be constructed from a single magnet. Alternatively, the magnet 3 may be formed from an integrally-formed plural magnets.

The torsion spring 5 and the magnet 3 are mounted in the frame 1 in a manner described below. The torsion spring 5 is pulled or stretched along its longitudinal axis with a tension of a certain amount. The upper and lower ends of the torsion spring 5 are then attached to the upper and lower sides of the frame 1, respectively. The jigs 2 are then mounted on both the upper and lower sides of the frame 1 so that the both ends of the torsion spring 5 are sandwitched between the jigs 2 and the frame 1. Screws are tightened so that the jigs 2 are fixedly secured to the frame 1. As a result, the upper and lower ends of the torsion spring 5 are fixedly secured to the frame 1. Then, the magnet 3 is attached to substantially the central portion of the torsion spring 5 via an adhesive.

As shown in FIG. 1, the coil 7 is provided to the rear side of the frame 1 so that the coil 7 confronts the side 3n of the magnet 3. The coil 7 is constructed from an electric wire which is wound around a cylindrical-shaped core 6 with a density of 300 turns/cm. The core 6 is made from a non-magnetic material, and is formed with a pair of holes 8. The coil 7 is attached to the frame 1 so that the holes 8 confront the through-holes 4 of the frame 1. A pair of screws (not shown) are inserted into the holes 8 and the through-holes 4 so that the coil 7 is fixedly secured to the frame 1.

An alternating current pulse generator 9 is electrically connected between both ends of the coil 7. The pulse generator 9 is designed so as to be capable of supplying the coil 7 with an alternating current of a rectangular waveform. For example, the pulse generator 9 applies an electric voltage of 3 V through the coil 7 so that an alternating current of 100 mA will flow in the coil 7, whereby the coil 7 produces an alternating magnetic field with a strength of 3,000 A/m (=300 turns/cm×100 mA). The alternating magnetic field generates a rotational force on the magnet 3. The magnet 3 therefore angularly oscillates in a resonant mode about the longitudinal axis of the torsion spring 5. Following the angular oscillation of the magnet 3, the torsion spring 5 angularly oscillates or twists in a resonant mode about its longitudinal axis. In other words, the oscillating system 200, comprised of the torsion spring 5 and the magnet 3, angularly oscillates in a resonant mode about the axis of the torsion spring 5.

The optical scanner 100 having the above-described structure is located so that a laser beam 10 emitted from a light source 11 will fall incident on the mirror surface 3m of the magnet 3 and so that the laser beam will reflect off the mirror surface 3m. With this positional arrangement, when the magnet 3 resonates about the axis of the torsion spring 5, the magnet 3 will scan the laser beam in a direction orthogonal to the axis of the torsion spring 5. A scanning medium 12, desired to be scanned by the laser beam, is located at a position that the scanned laser beam will fall incident on the scanning medium 12.

With the above-described structure, the optical scanner 100 operates as described below.

Figure 3A:
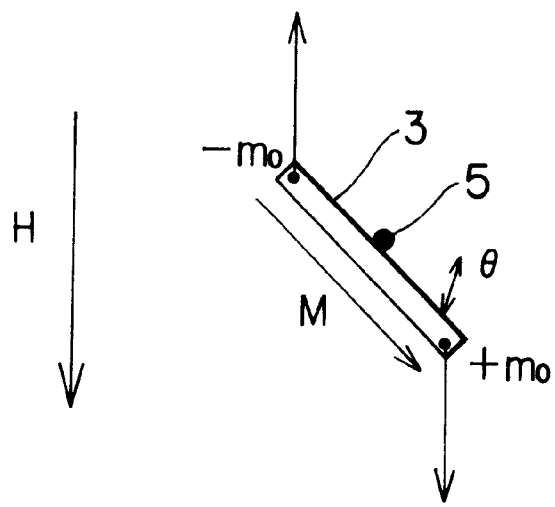
FIGS. 3(a) and 3(b) show how a magnet in the optical scanner is applied with a torque produced by an alternating magnetic field in the first embodiment.
Figure 3B:
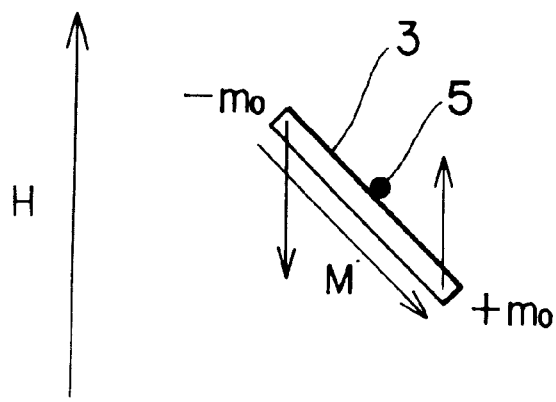

When the coil 7 is applied with a pulse current as shown in FIG. 2, an alternating magnetic field H is generated both in front and rear sides of the coil 7. The magnet 3 is located in front of the coil 7 with its center being fixed to the torsion spring 5. Accordingly, as shown in FIGS. 3(a) and 3(b), the magnet 3 is applied with a torque of MH·cos θ from the alternating magnetic field H, wherein M represents a magnetic moment of the magnet 3, H represents a magnitude of the magnetic field, and θ represents an angle by which the magnet 3 angularly shifts from its original orientation. (In the figures, $m_0$ indicates a magnetization intensity of the magnet 3.)

The magnet 3 is also applied with a restorative force "kθ" which is produced by energy stored in the torsion spring 5 wherein "k" represents a spring modulus of the torsion spring 5. It is noted that when the magnet 3 oscillates with a high frequency, the magnet 3 is further applied with an attenuation force originated from a friction resistance of the magnet 3 against air and from a friction resistance produced inside the torsion spring 5. The attenuation force has an amount proportional to the amount "dθ/dt".

Accordingly, the magnet 3 angularly oscillates when the magnet 3 is periodically applied with the torque of MH·cos θ at an angular frequency ω.

This oscillation system is represented by the following formula (1):

$$I \cdot d^2\theta/dt^2 + C \cdot d\theta/dt + k\theta = MH \cdot \cos \omega t \tag{1}$$

wherein:

θ indicates an angle with which the magnet 3 angularly shifts from its original orientation;

"I" indicates a moment of inertia of the magnet 3;

"C" indicates an attenuation coefficient;

"k" indicates the spring modulus of the torsion spring 5;

"M" indicates the magnetic moment of the magnet 3;

"H" indicates the magnitude of the magnetic field;

"ω" indicates a frequency of the alternating current, i.e., a frequency of the alternating magnetic field; and "t" indicates time.

The above formula (1) shows a damped oscillation system applied with a force. An amount of θ satisfying the formula (1) is represented by the following equations (2-1):

$$\theta = (MH/I) \cdot [(\omega_0^2 - \omega^2)^2 + 4\mu^2\omega^2]^{-1/2} \cdot \cos(\omega t - \alpha) \tag{2-1}$$

wherein $$\tan \alpha = 2\mu\omega/((\omega_0^2 - \omega^2)) \tag{2-2}$$

$$\mu = C/2I \tag{2-3}$$

"ω" indicates a natural frequency of the oscillating system 200, comprised of the magnet 3 and the torsion spring 5; and "α" indicates a phase delay angle. It is noted that $\omega_0 = (k/m)^{1/2}$ where m is the mass of the magnet 3.

As apparent from the above, the magnet 3 angularly oscillates in a resonant mode when the frequency ω of the alternating current is equal to the natural frequency $\omega_0$ of the oscillation system 200 comprised of the magnet 3 and the torsion spring 5. In the resonant mode, the magnet 3 angularly oscillates with a maximum oscillation angle.

According to the present example, when the coil 7 is supplied with an electric voltage of 3 volts and an electric current of about 100 mA is caused to flow in the coil 7, the magnet 3 resonates with a frequency of about 800 Hz at an oscillation angle of about 50 degrees. The mirror surface 3m of the magnet 3 can therefore scan the laser beam 10 with a scanning angle of about 100 degrees. Thus, with the above-described simple configuration, the optical scanner 100 of the present embodiment can scan the laser beam with a large scanning angle.

In the above-description, the optical scanner 100 is designed so as to be capable of scanning the laser beam with a scanning angle of 100 degrees at a frequency of 800 Hz. However, the optical scanner 100 can be designed so as to be capable of scanning the laser beam at other various values of frequencies through changing the diameter and the length of the torsion spring 5 and the mass of the magnet 3 in a manner described below.

Generally, the oscillation frequency f ($\omega_0$) is proportional to $(k/m)^{1/2}$ where k is the spring modulus of the magnet 3 and m is the mass of the magnet 3. Because "k" is proportional to $\phi^4$ where $\phi$ is the diameter of the torsion spring 5, the frequency f ($\omega_0$) is proportional to the square of the spring diameter $\phi$. Because the resonant frequency becomes 800 Hz when the diameter $\phi$ is 140 micrometers, using the torsion spring 5 with the diameter $\phi$ of 100 micrometers can allow the oscillating system 200 to resonate at about 400 Hz.

In the above description, the magnet 3 with the resilient flux density of about 10,000 gausses is located in the alternating magnetic field with the magnitude of 3,000 A/m (=300 turns/cm×100 mA). The magnet 3 therefore scans the laser beam with the scanning angle of 100 degrees. When the optical scanner 100 is used in a laser beam printer, it is practical that the pulse generator 9 be controlled to supply the coil 7 with an electric current of several hundreds milliamperes and thereby to produce magnetic flux with its density of about several thousands gausses.

It is noted that as apparent from the above-described equation (2-1), the oscillating angle θ greatly depends on the coefficient "MH/I". It is therefore possible to control the oscillating angle θ through employing a magnet with a desired amount of magnetic moment M. It is possible to control the oscillating angle θ also through changing the magnitude H of the magnetic field. Because the magnetic field magnitude H is equal to ni where n is the number of turns of the coil 7 and i is the amount of current flowing through the coil 7, it is possible to easily adjust the magnitude H through changing the amount of currents flowing through the coil 7 and/or the number of turns of the coil 7. It is therefore possible to easily change the oscillating angle θ, i.e., the laser beam scanning angle 2 θ.

According to the present invention, the alternating current pulse generator 9 is designed to apply an electric current of a rectangular waveform to the coil 7.

Figure 4B:
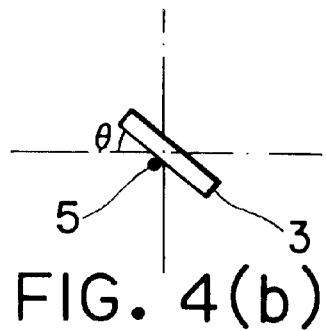
FIG. 4 illustrates how the magnet angularly oscillates according to an alternating current of a rectangular waveform applied to a coil.
Figures 4A, 4C:
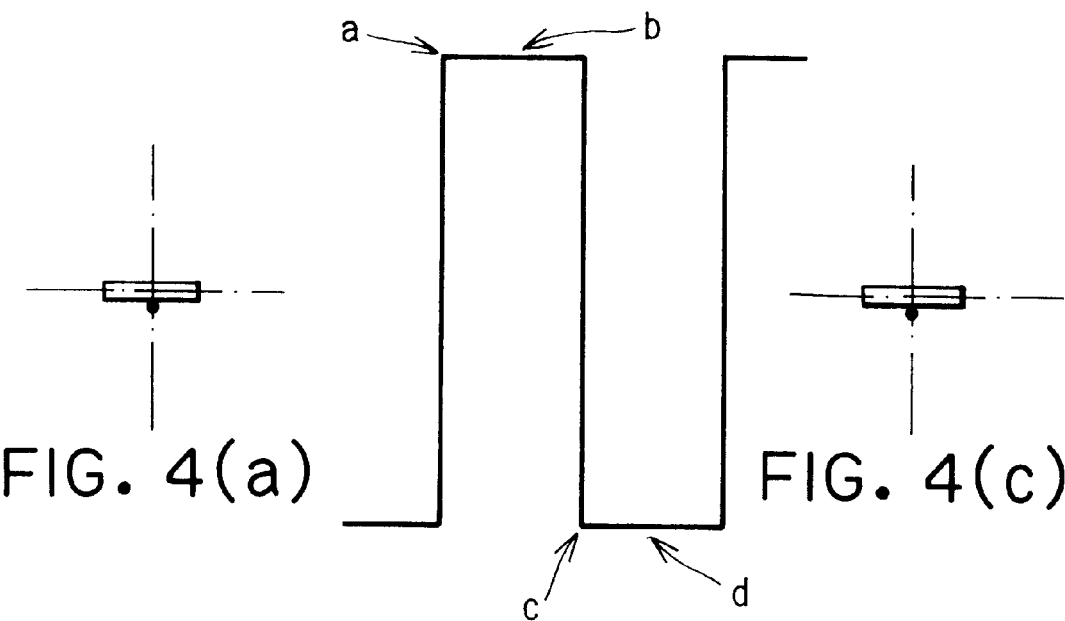
Figure 4D:
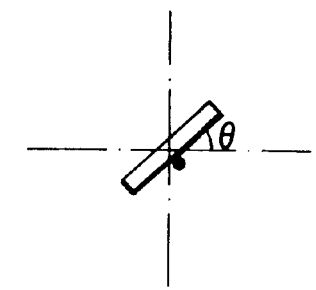

As shown in FIG. 4, when the magnet 3 angularly shifts from the original. orientation (shown in FIG. 2) with the angle θ (=ωt), the magnet 3 is applied with a torque of MH·cos θ. In other words, the alternating magnetic field H·cos θ is applied to the magnetic moment M of the magnet 3. FIG. 4 shows how the magnet 3 angularly oscillates with the angle θ (=ωt) according to the rectangular waveform of the electric current. In the figure, the magnet 3 oscillates to reach the angular positions (a), (b), (c), and (d) when the rectangular wave of the electric current reaches the points a, b, c, and d.

As apparent from this figure and the equation (2-2), when $\omega=\omega_0$ the delay angle α becomes equal to 90 degrees. That is, the magnet 3 angularly oscillates with its angular position θ being delayed by 90 degrees from the alternating magnetic field. The angular shift amount θ of the magnet 3 becomes maximum at a timing delayed by 90 degrees from the timing when the magnetic field switches. At this timing, the restorative force kθ, produced by the energy stored in the torsion spring 5, also becomes maximum. Thus, the rectangular waveform of the alternating current can continue applying torque to the magnet 3 until the restorative force of the torsion spring 5 becomes maximum. Accordingly, in comparison with other waveforms, the rectangular waveform of the electric current can increase the scanning width of the laser beam. It is therefore possible to maximize the scanning width with the smallest amount of electric current. The optical scanner 100 can therefore operate with a high energy efficiency. It is noted, however, that if it is unnecessary to provide a great scanning width, the alternating current pulse generator 9 may be designed to apply electric currents of other various waveforms, such as a sine wave and a triangular wave, and the like.

In the above description, the frame 1 is attached to the coil 7 so that the torsion spring 5 and the magnet 3 are located in front of the coil 7. However, the torsion spring 5 and the magnet 3 may be located at different positions around the coil 7 where the generated magnetic flux extends in a direction substantially orthogonal to the magnetic moment M of the magnet 3.

Figure 5:
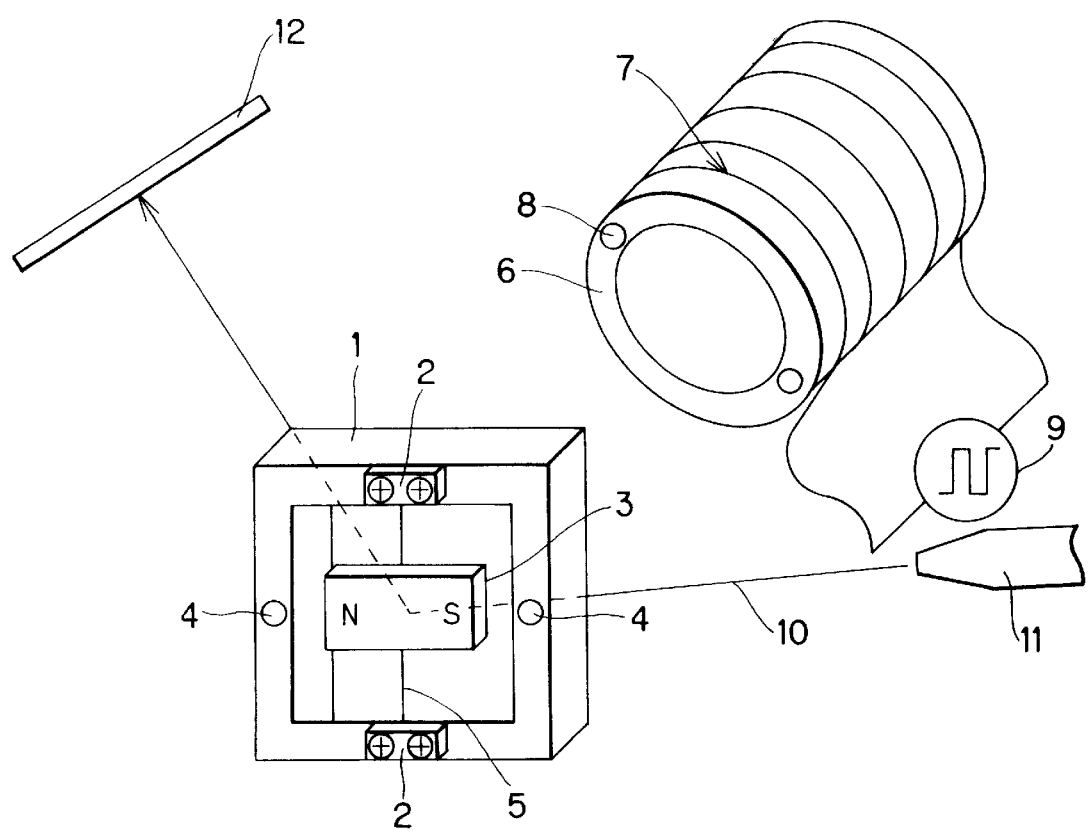
FIG. 5 shows a perspective view of a modification of the optical scanner of the first embodiment.

In the above description, the frame 1 is fixedly secured via screws to the coil 7. However, the frame 1 may be detachably combined with the coil 7. Accordingly, the coil 7, the magnet 3, the light source 11, and the scanning medium 12 may be arranged as shown in FIG. 5. In this case, the distance between the coil 7 and the magnet 3 can be freely selected. It is therefore possible to freely change the magnitude of the alternating magnetic field applied to the magnet 3, thereby changing the scanning angle. The oscillating system 200 can be controlled to resonate with a desired frequency through changing the positional relationship between the coil 7 and the frame 1. Because the positional relationship between the coil 7 and the frame 1 can be freely selected, the optical scanner 100 can be made more compact.

In the above description, the coil 7 is located in confrontation with the magnet 3. The light source 11 is located in confrontation with the magnet 3. However, the positional relationship therebetween is not limited to the above-described relationship.

In the above description, the core 6 is in the cylindrical shape. However, the shape of the core 6 may be freely changed. In order to prevent the magnetic flux from leaking from the core 6, material with high permeability such as ferrite may be provided inside the core 6.

In the above description, the torsion spring 5 is caused to oscillate in a resonant mode. Accordingly, the pulse generator 9 can supply a minimum amount of electric current to the coil 7. However, if the pulse generator 9 can supply more amount of electric current, the magnet 3 is not necessarily caused to resonate.

Next, the material of the torsion spring 5 will be described in greater detail.

According to the present embodiment, the torsion spring 5 is made of a shape-memory alloy such as a Ni—Ti alloy.

The shape-memory alloy is transformed into various phases in accordance with a stress applied thereto and in accordance with an ambient temperature. FIG. 6 shows a phase transformation occurred in the shape-memory alloy in accordance with the ambient temperature and in accordance with the applied stress. It is apparent from FIG. 6 that a shape-memory region exists at a temperature equal to or lower than a reverse transformation start point As and that a super elastic region exists at a temperature equal to or higher than a reverse transformation completion point Af. Thus, the shape-memory alloy presents a shape-memory effect when the shape-memory alloy is located in an ambient temperature equal to or lower than the reverse transformation start point As. The shape-memory alloy presents a super elasticity effect when the shape-memory alloy is located in an ambient temperature of equal to or higher than the reverse transformation completion point Af.

Figure 7A:
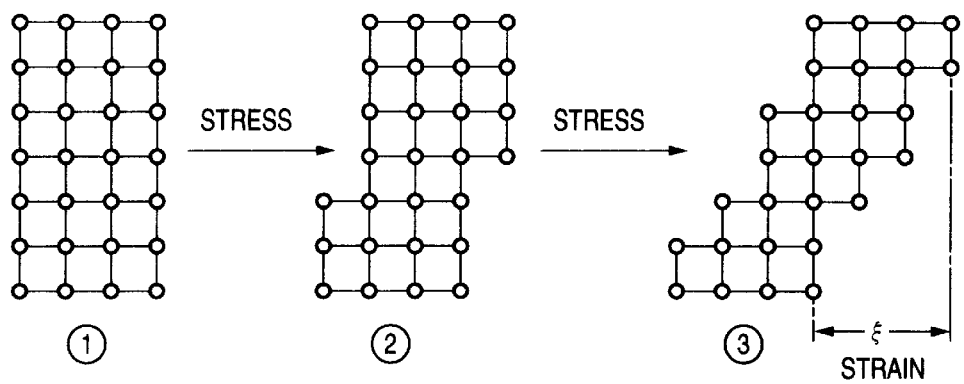
FIG. 7(a) shows how a general type of metal deforms when subjected to a shearing stress.
Figure 7B:
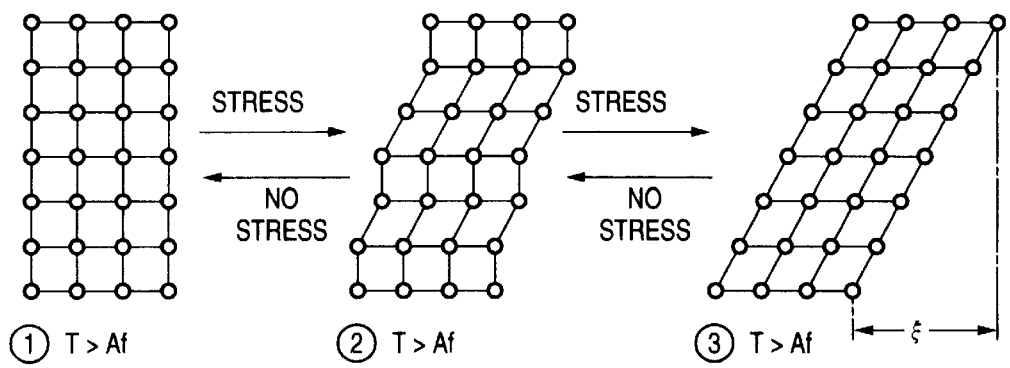
FIG. 7(b) shows how a shape-memory alloy, with its reverse transformation point Af lower than an ambient temperature, deforms with a super elastic effect when subjected to a shearing stress.
Figure 7C:
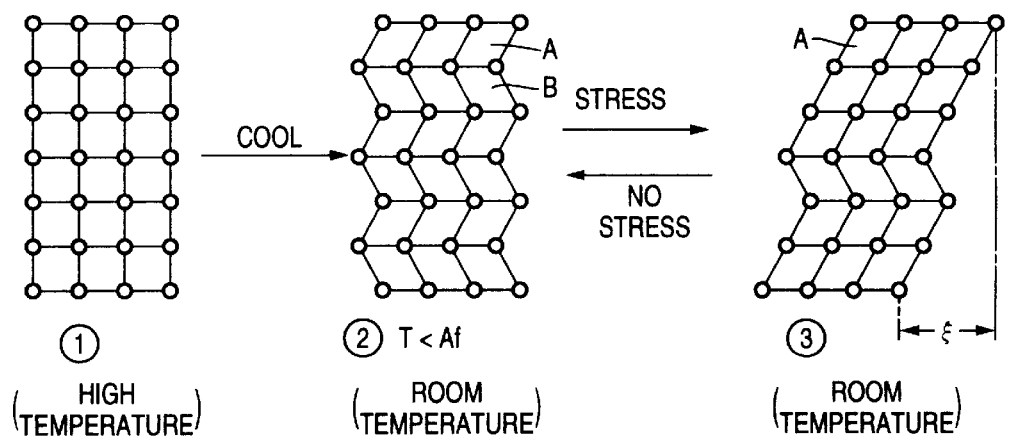
FIG. 7(c) shows how a shape-memory alloy, with its reverse transformation point Af higher than an ambient temperature, deforms with a shape memory effect when subjected to a shearing stress.

A transformation point is defined as a temperature, at which the state of the shape-memory alloy transforms from an austenitic phase, indicated by (1) in FIG. 7(b) and indicated by γ in FIG. 6, to a martensitic phase indicated by (2) and (3) in FIG. 7(b) and indicated by α and β in FIG. 6. The transformation point includes: a transformation start point Ms, at which the transformation is started, and a transformation completion point Mf, at which the transformation is completed (not shown in the drawing). The reverse transformation point is defined as a temperature, at which the state of the phase-memory alloy transforms from the martensitic phase back to the austenitic phase. The reverse transformation point includes: the reverse transformation start point As, at which the reverse transformation is started, and the reverse transformation completion point Af, at which the reverse transformation is completed. The reverse transformation completion point Af will be referred to simply as reverse transformation point Af hereinafter. It is noted that the transformation into the martensitic phase can be induced not only by an ambient temperature but also by a stress applied to the shape-memory alloy as shown in FIGS. 6 and 7(*b*).

Next will be described how the shape-memory alloy deforms when subjected to a shearing stress in comparison with how a general type of metal deforms when subjected to a shearing stress.

When the general type of metal is subjected to a shearing stress of an amount that exceeds a predetermined threshold, atoms slide along with one another as shown in FIG. 7(*a*), whereby a shearing strain is generated in the metal. Even when the force is stopped from being applied to the metal, the metal will not recover its original shape because the metal is stable in the deformed state. Accordingly, when the metal is repeatedly subjected to a stress, the generated strain will accumulate in the metal. The metal will finally suffer from metal fatigue.

When the shape-memory alloy is subjected to an external force, on the other hand, the shape-memory alloy deforms in two different ways according to a relationship between the reverse transformation point Af of the shape-memory alloy and the ambient temperature of the shape-memory alloy. Generally, the ambient temperature of the shape-memory alloy is a room temperature. The shape-memory alloy deforms as shown in FIG. 7(*b*) if the alloy has the reverse transformation point Af lower than the ambient temperature (room temperature). The shape-memory alloy deforms as shown in FIG. 7(*c*) if the alloy has the reverse transformation point Af higher than the ambient temperature (room temperature).

The deformation manners of the shape-memory alloy will be described in greater detail below.

If the shape-memory alloy has the point Af lower than the room temperature, when the alloy is subjected to an external stress, the alloy transforms from the austenitic phase (1) shown in FIG. 7(*b*) into the stress-induced martensitic phase, i.e., the super elastic region (2) shown in FIG. 7(*b*). Though the crystal structure of the alloy deforms, the atoms in the alloy do not slide along one another. The alloy in the martensitic phase, indicated by β in FIG. 6, is unstable when the ambient temperature is equal to or higher than the reverse transformation point Af. Accordingly, when the external force is stopped from being applied to the alloy, the alloy recovers the austenitic phase (indicated by γ in FIG. 6.) Even when the alloy is subjected to a repeated stress, the crystal structure of the alloy merely changes between the austenitic phase and the martensitic phase. The alloy will not be broken.

If the shape-memory alloy has the point Af higher than the room temperature, on the other hand, the shape-memory alloy will be always in the martensitic phase ((2) of FIG. 7(*c*)) in the room temperature. As shown in FIG. 7(*c*), brother crystals A and B are generated in the shape-memory alloy of the martensitic phase. A twin surface, defined between the brother crystals, moves even with a small amount of stress. The shape-memory alloy thus becomes relatively soft in the martensitic phase. When the shape-memory alloy is subjected to an external stress, one of the brother crystals A and B (A in this case), that is oriented in a preferred orientation with regards to the applied force, grows, whereby a shearing strain is generated at the twin surface as shown in (3) of FIG. 7(*c*). Generally, the shape-memory alloy may not completely recover the original shape even when the external stress is stopped from being applied to the shape-memory alloy. However, when the shape-memory alloy is immediately subjected to a reverse directional force, the shape-memory alloy can completely recover its original shape. When the shape-memory alloy is subjected to a repeated stress, therefore, the shape-memory alloy merely changes between the states (2) and (3) in FIG. 7(*c*). The shape-memory alloy will not be broken also in this case.

In view of this, according to the first embodiment, the torsion spring 5 is made of a shape-memory alloy with its reverse transformation point Af being lower than the room temperature. For example, the reverse transformation point Af is controlled to about 0 degrees (° C.). In this case, the shape-memory alloy presents the temperature-stress relationship as shown in FIG. 6.

Figure 10:
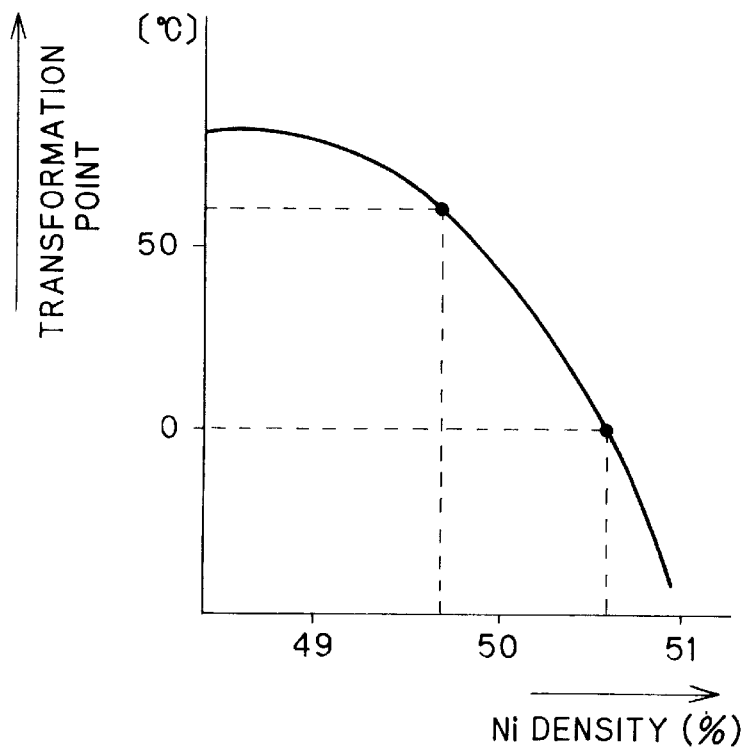
FIG. 10 is a graph showing how the reverse transformation point Af changes according to a density of Ni in the shape-memory alloy (Ni—Ti alloy)

As shown in FIG. 10, the reverse transformation point Af of the shape-memory alloy can be freely changed through adjusting the composition of the shape-memory alloy. For example, the reverse transformation point Af of the Ni—Ti alloy can be freely changed through adjusting the density of nickel (Ni) or through mixing impurity into the Ni—Ti alloy. The reverse transformation point Af can be controlled to about zero (0) degree (° C.) through controlling the density of the nickel (Ni) as about 50.6%. The reverse transformation point Af may also be controlled to about zero (0) degree (° C.) through adding a small amount of impurity of cobalt (Co) to the Ni—Ti alloy.

According to the present embodiment, the torsion spring 5, with its reverse transformation point Af being lower than the room temperature, is stretched or pulled along its longitudinal axis with a certain amount of tension before being fixedly secured to the frame 1.

Figure 8:
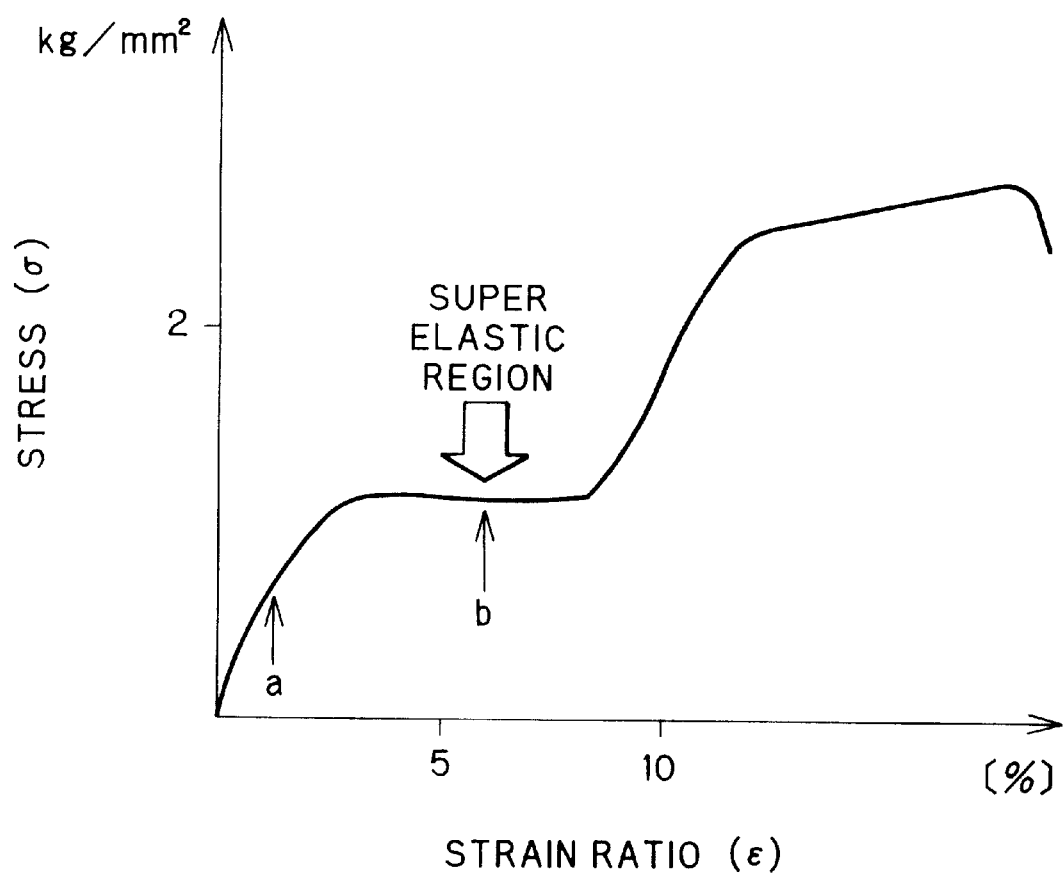
FIG. 8 is a graph indicative of a relationship between a stress applied to a shape-memory alloy in a super elastic region and a strain generated in the shape-memory alloy according to the applied stress.

For example, the torsion spring 5 can be stretched or pulled along its longitudinal axis with a tension of an amount indicated by an arrow "a" in FIG. 8, and then fixedly secured to the frame 1. In this case, the torsion spring 5 is originally in the austenitic phase (1) of FIG. 7(*b*). The torsion spring 5 is then repeatedly applied with a torsion originated from the interaction between the magnet 3 and the alternating magnetic field. Accordingly, the phase of the torsion spring 5 repeatedly transforms between the austenitic phase (1) and the stress-induced martensitic phase (super elastic phase) (2) in FIG. 7(*b*).

It is noted, however, that the torsion spring 5 can be stretched along its longitudinal axis preferably with a tension of a larger amount indicated by an arrow "b" in FIG. 8 before being fixed to the frame 1. In this case, the torsion spring 5 is already transformed into the martensitic phase, i.e., the super elastic region (2) of FIG. 7(*b*) through a stress-induced transformation. The torsion spring 5 is then repeatedly applied with a torsion originated from the interaction between the magnet 3 and the alternating magnetic field. Accordingly, the torsion spring 5 repeatedly changes between the states (2) and (3) in FIG. 7(*b*). It is noted that the states (2) and (3) are both in the martensitic phase.

Thus, the torsion spring 5, with its point Af being thus set to zero (0) degree, is applied with the certain amount of stress "b" so that the torsion spring 5 is easily transformed into the super elastic region (β in FIG. 6) as shown in FIG. 8. In this case, as indicated by a vertical arrow in FIG. 6, the crystal structure of the torsion spring 5 will not transform out of the super elastic region even when the cyclic stress is additionally applied to the torsion spring 5 from the interaction between the magnet 3 and the alternating magnetic field. As indicated by a horizontal arrow in FIG. 6, the crystal structure of the torsion spring 5 will not transform out of the super elastic phase even when the ambient room temperature slightly varies.

Figures 9A, 9B:
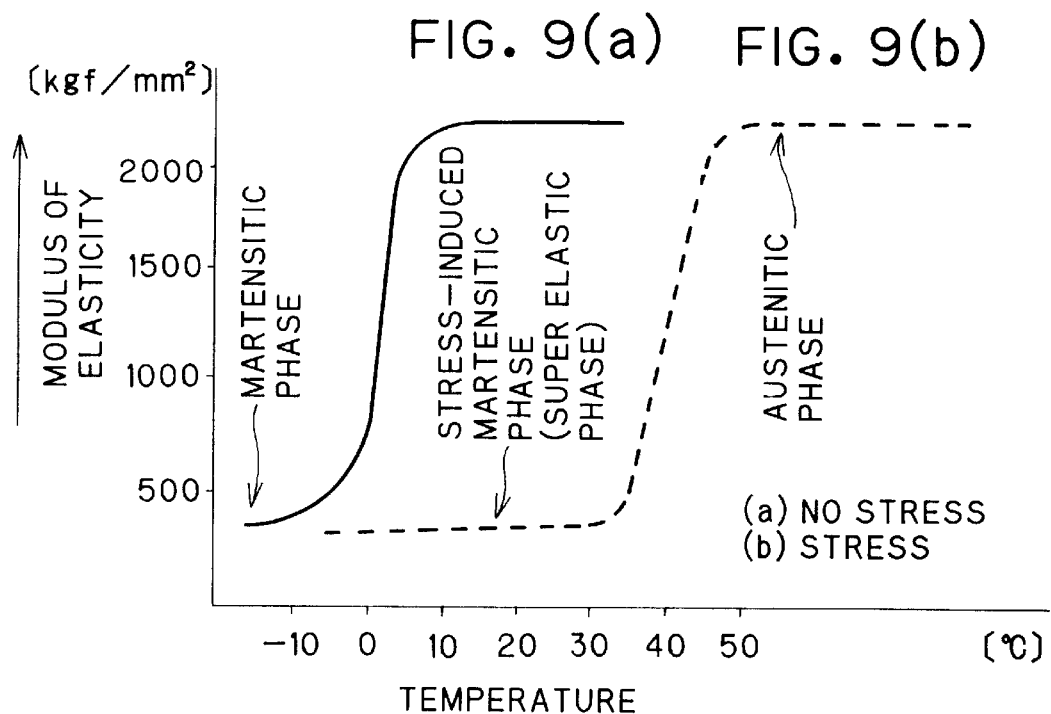
FIG. 9 is a graph showing how a modulus of elasticity of the shape-memory alloy of the first embodiment changes according to an ambient temperature.

It is noted that as shown in FIG. 9, the modulus of elasticity in the martensitic phase (super elastic phase) is lower than that in the austenitic phase shape-memory alloy. Accordingly, the torsion spring 5 in the super elastic phase will allow the magnet 3 to angularly oscillate with a larger oscillation width than that in the austenitic phase even when subjected to the alternating magnetic field of the same magnitude.

It is further noted that as shown in FIG. 9, the modulus of elasticity of the shape-memory alloy in the super elastic phase is stable with regards to change in the ambient temperature. A solid line (a) in FIG. 9 indicates how the elasticity modulus of the shape-memory alloy, applied with no stress (zero stress), changes according to the ambient temperature. A dot line (b) in FIG. 9, on the other hand, indicates how the elasticity modulus of the shape-memory alloy, applied with a certain amount of stress, changes according to the ambient temperature. It is apparent that though the modulus of elasticity rapidly changes at the transformation point, the modulus of elasticity is substantially unchanged when the alloy is in the martensitic phase or in the austenitic phase. Accordingly, even when a torsion is repeatedly applied to the shape-memory alloy in the super elastic phase, the elasticity modulus does not change with regards to the ambient temperature. It is reliable that the resonant frequency of the magnet 3 becomes stable with regards to the ambient temperature change.

In the above-description, the torsion spring 5 is made of Ni—Ti alloy. However, the torsion spring 5 may be comprised of other various shape-memory alloys which are capable of exhibiting the stress-induced phase transformation to present the super elastic effect. Representative examples of the shape-memory alloys include Ni—Ti alloy, Cu—Zn alloy, Ag—Cd alloy, Au—Cd alloy, Cu—Sn alloy, Cu—Al—Ni alloy, Ni—Al alloy, and Fe—Pt alloy.

As described above, in the optical scanner 100 of the first embodiment, the magnet 3 is integrally formed with a mirror surface for reflecting off a laser beam. A torsion spring 5 holds the magnet 3 thereon. The torsion spring 5 is made of a super elastic alloy. The coil 7 generates an alternating magnetic field so as to oscillate the magnet 3 about the torsion spring 5. The oscillating magnet 3 can scan the light beam. In more concrete terms, the magnetic field applies a torque to the magnet 3 held by the torsion spring 5. The magnet 3 is also applied with a restorative force produced by the torsion spring 5. Accordingly, the magnet 3 angularly oscillates when a periodic magnetic field is applied to the magnet 3. The magnet 3 resonates especially when the frequency of the magnetic field is equal to the natural frequency of the oscillating system 200, comprised of the torsion spring 5 and the magnet 3. The magnet 3 resonates with a maximum amplitude. The mirror surface 3m can reflect the light beam so that the light beam be scanned in a direction perpendicular to the axis about which the magnet 3 oscillates.

The super elastic alloy, constructing the torsion spring 5, is made of a shape-memory alloy with its reverse transformation point Af being adjusted lower than a room temperature. The super elastic alloy is selected from a group consisting of Ni—Ti alloy, Cu—Zn alloy, Ag—Cd alloy, Au—Cd alloy, Cu—Sn alloy, Cu—Al—Ni alloy, Ni—Al alloy, and Fe—Pt alloy. These types of super elastic alloy has a high fatigue limit. Even when applied with a relatively small amount of stress, these types of super elastic alloy can transform from the austenitic phase to the martensitic phase. The modulus of elasticity of the alloy in each of the austenitic phase and in the martensitic phase is unchanged with regards to the change in the room temperature. Thus, the optical scanner 100 of the present embodiment can scan the light beam with a resonance frequency which is stable with regards to the room temperature change.

The torsion spring is applied with the predetermined amount of tension "a" and is fixedly secured to the housing. The predetermined amount of tension causes the torsion spring to present the austenitic phase. Accordingly, the magnet 3 can scan the light with a frequency stable with regards to the room temperature change.

Alternatively, the predetermined amount of tension may be such a value "b" that induces a stress-induced martensitic phase in the torsion spring 5 where a stress-strain ratio curve of FIG. 8 has a gradient substantially of a zero value. The modulus of elasticity presented by the torsion spring in the stress-induced martensitic phase is lower than that presented by the torsion spring in the austenitic phase. Accordingly, even applied with the same magnetic field, the torsion spring in the stress-induced martensitic phase can rotate the magnet with a larger angle, in comparison with that in the austenitic phase. The modulus of elasticity of the torsion spring in the stress-induced martensitic phase is stable with regards to the change in the room temperature. Accordingly, the optical scanner 100 can scan the light beam with a stable resonance frequency at a larger scanning angle.

Figure 12:
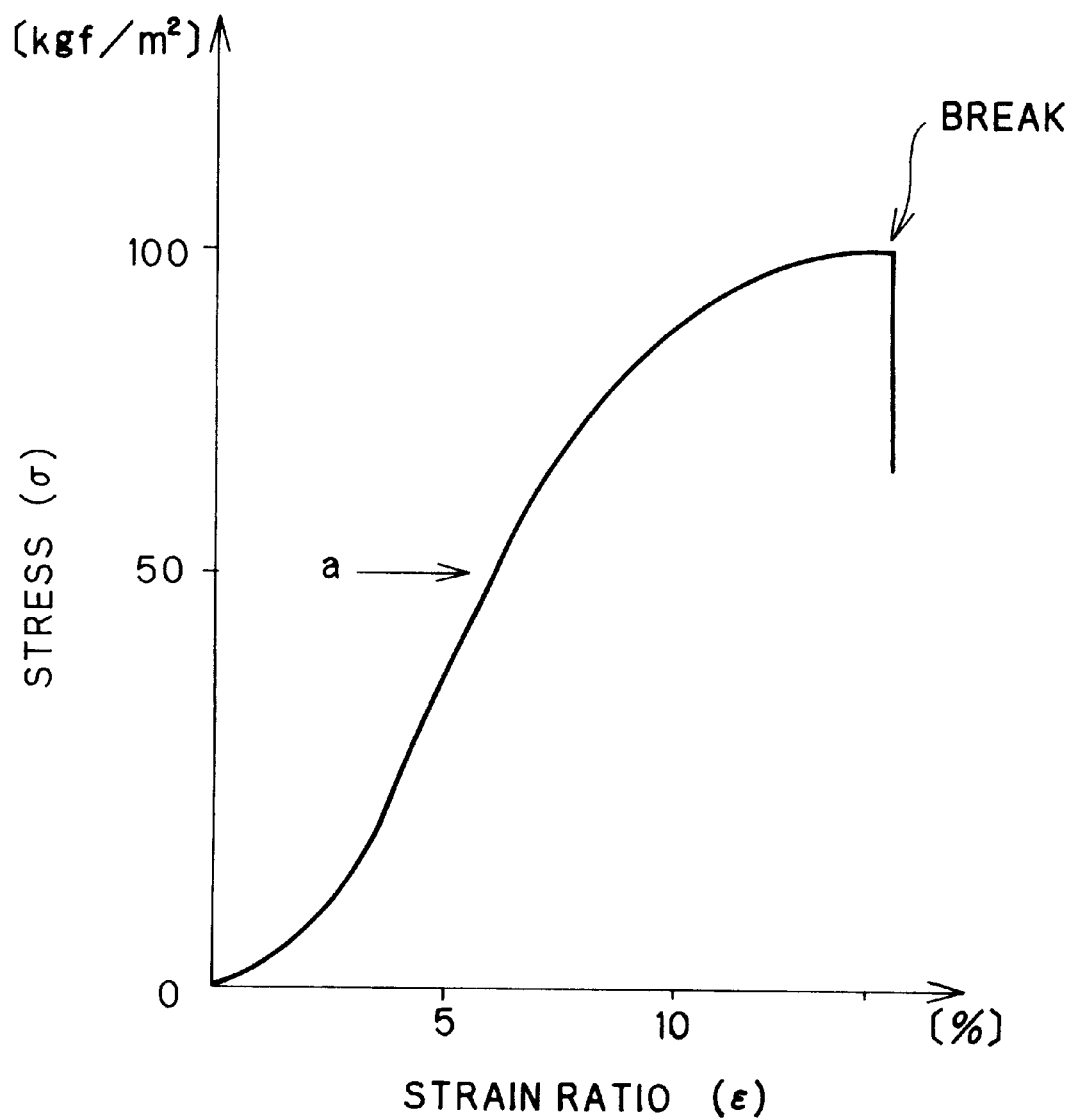
FIG. 12 is a graph indicative of a relationship between a stress applied to a shape-memory alloy in the shape-memory region and a strain generated in the shape-memory alloy according to the applied stress.
Figure 13:
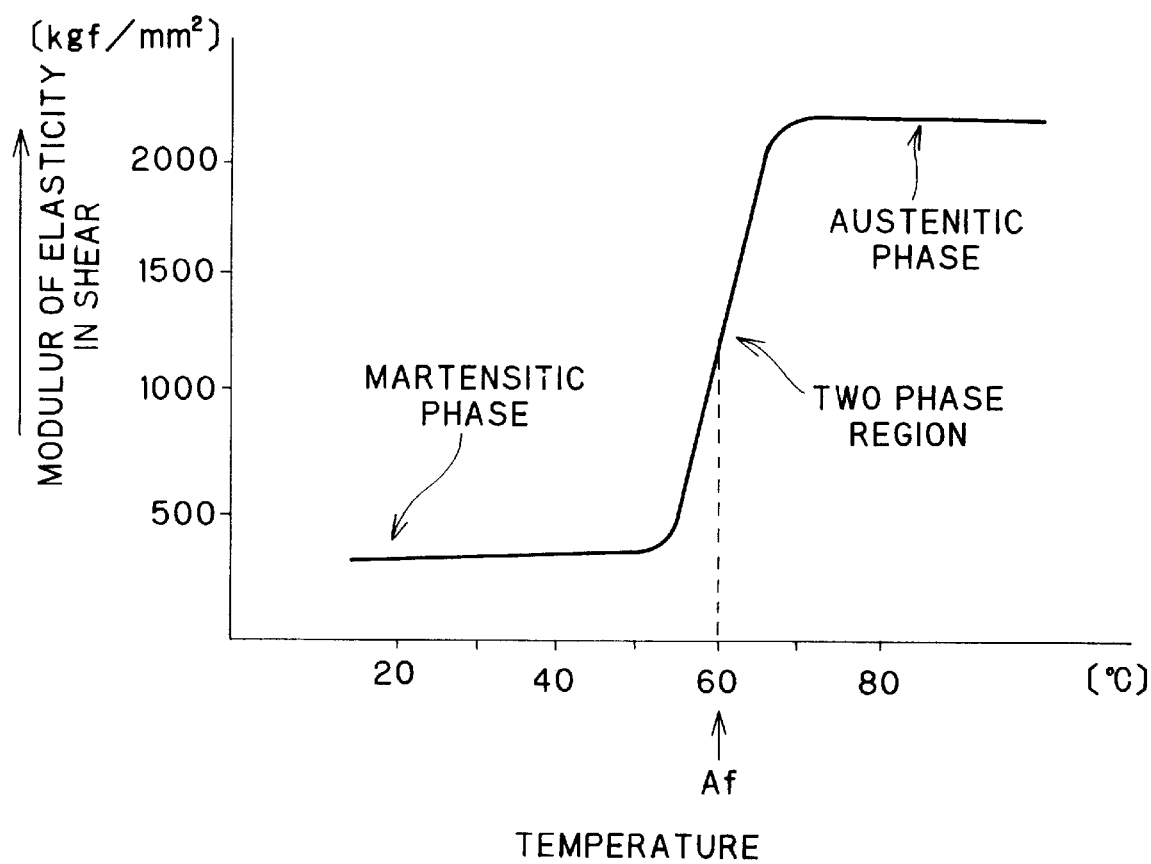
FIG. 13 is a graph showing how a modulus of elasticity of the shape-memory alloy of the second embodiment changes according to an ambient temperature.

A second preferred embodiment of the present invention will be described below with reference to FIGS. 11 through 13.

In the first embodiment, the torsion spring 5 is made from the phase-memory alloy with its reverse transform point Af being lower than the room temperature. The torsion spring 5 is operated in the stress-induced martensitic phase (super elastic phase) in the room temperature.

Contrarily, according to the present embodiment, the torsion spring 5 is made from a phase-memory alloy with its reverse transform point Af being higher than the room temperature. The torsion spring 5 is operated in a temperature-induced martensitic phase (shape-memory phase) in the room temperature.

For example, the reverse transformation point Af is controlled to about 60 degrees (° C.). In this case, the shape-memory alloy presents the temperature-stress relationship as shown in FIG. 11. As apparent from FIG. 11, when the shape-memory alloy, with the point Af being higher than the room temperature, is located in the room temperature, the shape-memory alloy presents a very high permanent deformation limit stress σc(PERM), i.e., "b" and a very low stress-induced transformation limit stress σc(SIM). Accordingly, the shape-memory alloy generally presents a temperature-induced martensitic phase, i.e., the shape-memory phase.

As described in the first embodiment with reference to FIG. 10, the reverse transformation point Af of the shape-memory alloy can be freely changed through adjusting the composition of the shape-memory alloy. The reverse transformation point Af can therefore be controlled to about 60 degrees (° C.) through controlling the density of the nickel (Ni) as about 49.7%.

According to the present embodiment, the torsion spring 5, with its reverse transformation point Af being higher than the room temperature, is located in the room temperature. Accordingly, the torsion spring 5 is transformed into the martensitic phase, i.e., the shape-memory region (2) of FIG. 7(c) through a temperature-induced transformation. The torsion spring 5 is stretched or pulled along its longitudinal axis with a tension of an amount indicated by an arrow "a" in FIGS. 11 and 12 before being fixed to the frame 1. The stress "a" is about a half of the permanent deformation critical stress σc(PERM), i.e., "b" at the room temperature. At this time, as also shown in FIG. 11, the torsion spring 5 remains in the temperature-induced martensitic phase, i.e., the shape-memory region (2) of FIG. 7(c).

The torsion spring 5 is then repeatedly applied with a torsion originated from the interaction between the magnet 3 and the alternating magnetic field. Accordingly, the torsion spring 5 repeatedly changes between the states (2) and (3) in FIG. 7(c). It is noted that the states (2) and (3) are both in the martensitic phase. It is further noted that a load now provided to the torsion spring 5 is a composite force of the external force applied to the small magnet 3 from the alternating magnetic field and the restorative force produced by energy stored in the torsion spring 5.

It is noted that the torsion spring 5 is thus stretched with the amount of stress "a." Then, in order to secure the torsion spring 5 to the frame 1, the screws are tightened against the jigs 2 and the frame 1 so that a force of about several kgf's is applied to the upper and lower ends of the torsion spring 5. Accordingly, before being applied with the shearing force from the magnetic field, the torsion spring 5 is already applied with a compression stress of about several tens kgf/mm². Accordingly, when the torsion spring 5 is affected by the magnetic field, the upper and lower ends of the torsion spring 5 will be subjected to a composite force of: the originally-applied tension, the compression stress applied from the tightened screws, and the shearing stress produced from the magnetic field. However, the composite force will not excess the permanent deformation critical stress σc(PERM) because the permanent deformation critical stress σc(PERM) has a very high value "b" in the shape-memory region as shown in FIG. 11. The torsion spring 5 will not be broken.

It is noted that in FIG. 11, each of the permanent deformation critical stress line σc(PERM) and the stress-induced transformation critical stress line σc(SIM) has a line shape. However, these lines actually have certain amounts of widths. Especially in the stress-induced transformation critical stress line σc(SIM), the shape-memory alloy presents both the martensitic phase and the austenitic phase. In view of this, the torsion spring 5 of the present embodiment is originally applied with a stress "a" of about a half of the permanent deformation critical stress σc(PERM), i.e., "b" in the room temperature so that both of the two phases will not be generated in the torsion spring 5. The torsion spring 5 will be certainly operated only in the martensitic phase.

In the two-phase state, the modulus of elasticity in shear is unstable with regards to the temperature change. However, in the martensitic phase, the elasticity modulus in shear is stable with regards to the temperature change. FIG. 13 shows a relationship between ambient temperature and modulus of elasticity of the shape-memory alloy applied with no stress. As apparent from the figure, though the modulus of elasticity rapidly changes at the transformation point (i.e., the two-phase state), the modulus of elasticity is substantially unchanged in the martensitic phase or in the austenitic phase. In the present embodiment, a torsion is repeatedly applied to the shape-memory alloy completely in the temperature-induced martensitic phase (shape-memory region). Accordingly, the elasticity modulus does not change with regards to the ambient temperature. It is reliable that the resonant frequency of the magnet 3 becomes stable with regards to the ambient temperature change. The torsion spring 5 can stably operate to resonate in the operation point C in FIG. 11. The magnet 3, attached to the torsion spring 5, can therefore stably scan the light beam.

The optical scanner 100 is constructed in the same manner as in the first embodiment with using the torsion spring 5 made from the Ni—Ti alloy with its reverse transformation point Af of 60 degrees (° C.). The optical scanner 100 has the same structure as in the first embodiment shown in FIG. 2. The torsion spring 5 has a diameter of about 300 μm and a length of about 25 mm. The magnet 3 has a plate shape with its vertical width of 4 mm, a horizontal length of 8 mm, and a thickness of 0.4 mm. The coil 7 is constructed from an electric wire with a density of 300 turns/cm. The pulse generator 9 is controlled to apply an electric voltage of 5 volts through the coil 7 so that an electric current of about 100 mA flows through the coil 7. In the same manner as in the first embodiment, the coil 7 produces an alternating magnetic field with a strength of 3,000 A/m (=300 turns/cm×100 mA).

With the above-described parameters, the oscillating system 200, comprised of the torsion spring 5 and the magnet 3, angularly oscillates with a resonant frequency of 400 Hz. The oscillating system 200 oscillates with an oscillation width of 40 degrees. Accordingly, the magnet 3 can scan the laser beam with a scanning width of about 80 degrees.

When the diameter of the torsion spring 5 is changed from 300 μm to 480 μm, the oscillating system 200 will oscillate with a frequency of 1 kHz because the resonant frequency is proportional to the square of the diameter of the torsion spring 5.

The scanning width of 80 degrees can be freely controlled through selecting the magnetic moment of the magnet 3, the turn number of the coil 7, and/or the amount of the electric current flowing through the coil 7.

In the above-description, the torsion spring 5 is made of Ni—Ti alloy. However, the torsion spring 5 may be comprised of other various shape-memory alloys which are capable of being transformed into the temperature-induced martensitic phase to present the shape-memory effect. Representative examples of the shape-memory alloys include Ni—Ti alloy, Cu—Zn alloy, Ag—Cd alloy, Au—Cd alloy, Cu—Sn alloy, Cu—Al—Ni alloy, Ni—Al alloy, and Fe—Pt alloy.

As described above, according to the present embodiment, the torsion spring 5 is made of the shape-memory alloy such as Ni—Ti alloy and Cu—Zn alloy with its reverse transformation point Af being higher than a room temperature. Accordingly, when located in the room temperature, the torsion spring 5 is always in the martensitic phase. The torsion spring 5 therefore presents an improved fatigue limit. The torsion spring 5 will not be broken at their ends where the torsion spring 5 is secured to the frame 1 and where stress is concentrated. The optical scanner 100 will have a long life.

The torsion spring 5 is pulled taut before being secured to the frame 1. The torsion spring 5 is therefore certainly brought into the martensitic phase and has a desired modulus of elasticity. The modulus of elasticity will not change according to the ambient temperature change. The optical scanner 100 can therefore scan the light beam with a stable frequency.

A third preferred embodiment will be described below with reference to FIGS. 14 through 18.

In the above-described first and second embodiments, the oscillating system 200, comprised of the torsion spring 5 and the magnet 3, is caused to resonate to scan the light beam with a large scanning width. It is noted, however, that the modulus of elasticity of the shape-memory alloy (torsion spring 5) is generally apt to greatly change in accordance with the change in the ambient temperature. When the modulus of elasticity changes, the natural frequency of the oscillating system 200 also changes to shift from the frequency of the alternating magnetic field, as a result of which the oscillating system 200 will not resonate. In the first and second embodiments, therefore, the torsion spring 5 is used in its martensitic phases (stress-induced martensitic phase and temperature-induced martensitic phase) where the modulus of elasticity changes little in accordance with the ambient temperature.

It is further noted that the natural frequency of the oscillating system 200 also changes when the external size of the actually-produced torsion spring 5 is erroneously shifted from a desired one. The natural frequency of the oscillating system 200 also changes when the position of the torsion spring 5, attached to the frame 1, is erroneously shifted from a desired position. Because the oscillating system 200 oscillates with little attenuation, when the natural frequency shifts from the frequency of the alternating magnetic field, the amplitude of the oscillation will greatly decrease. Accordingly, when the natural frequency shifts from the desired one, the optical scanner 100 of the present invention may fail to scan the light beam with a required scanning width.

In view of this, according to the present embodiment, the torsion spring 5 is used in its states where the modulus of elasticity changes largely or to some extent in accordance with the temperature change, thereby correcting for the erroneous shift of the natural frequency of the oscillating system 200. That is, because the natural frequency of the oscillating system 200 is proportional to the square root of the modulus of elasticity, the natural frequency is controlled through changing the temperature of the torsion spring 5. In the present embodiment, the temperature of the torsion spring 5 is feedback controlled into a suitable value, so that the natural frequency of the oscillating system 200 be maintained equal to the frequency of the alternating magnetic field.

Figure 14:
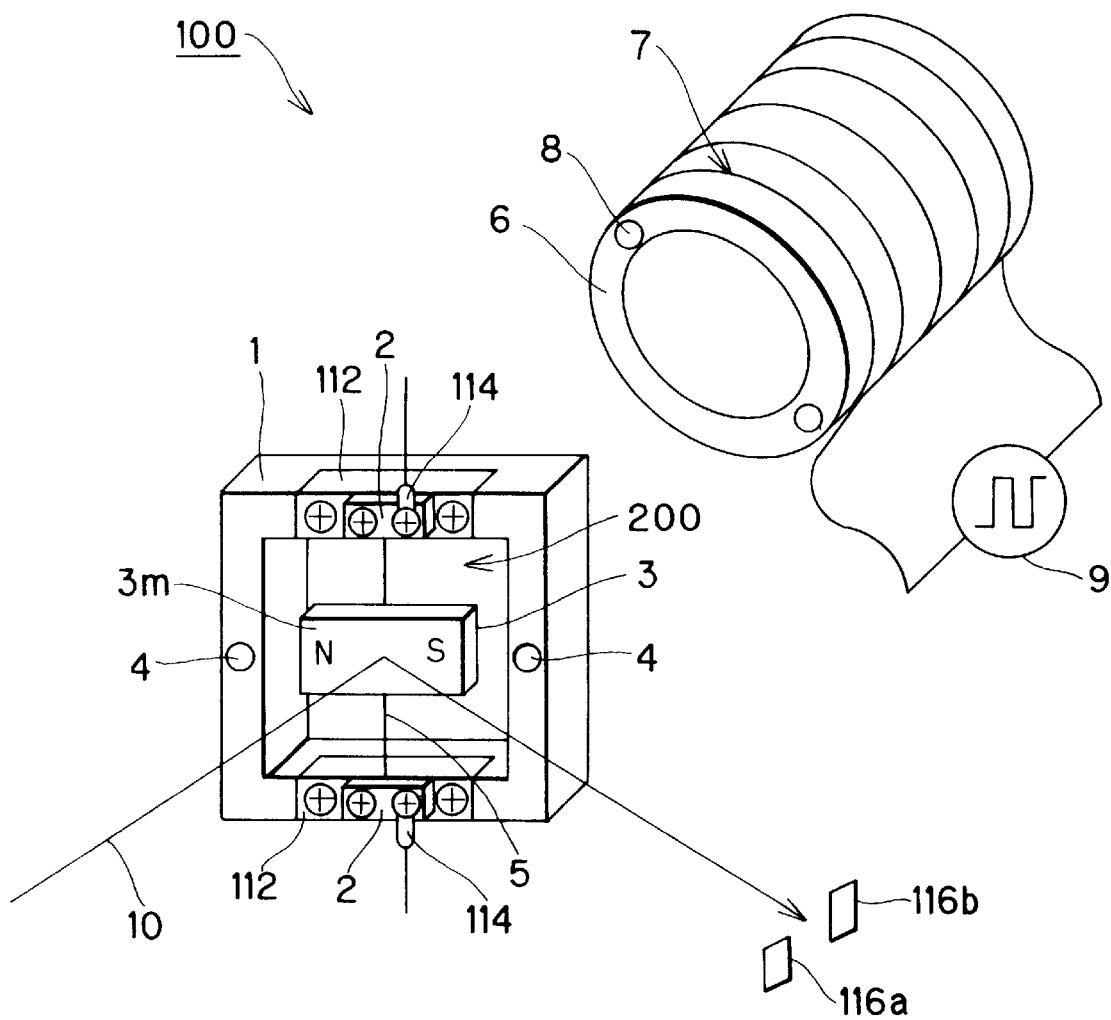
FIG. 14 is a perspective view showing an optical scanner of a third embodiment according to the present invention where a frame and a coil are separated from each other.

As shown in FIG. 14, according to the present embodiment, a pair of fixing jigs 112 are respectively fixed to both the upper and lower sides of the frame 1 via screws. Each securing jig 112 is made of polyacetal (POM) which is an electric insulation material. Each of the upper and lower ends of the torsion spring 5 is sandwiched between a corresponding fixing jig 112 and a corresponding jig 2. Screws are tightened so that each end of the torsion spring 5 is fixedly secured between the fixing jig 112 and the jig 2. An electric terminal 114 is also fixed to each jig 2 via a screw. The electric terminal 114 is for electrically connecting the torsion spring 5 with a driver 118 shown in FIG. 15. In this example, the torsion spring 5 is made from a Ni—Ti alloy.

Figure 15:
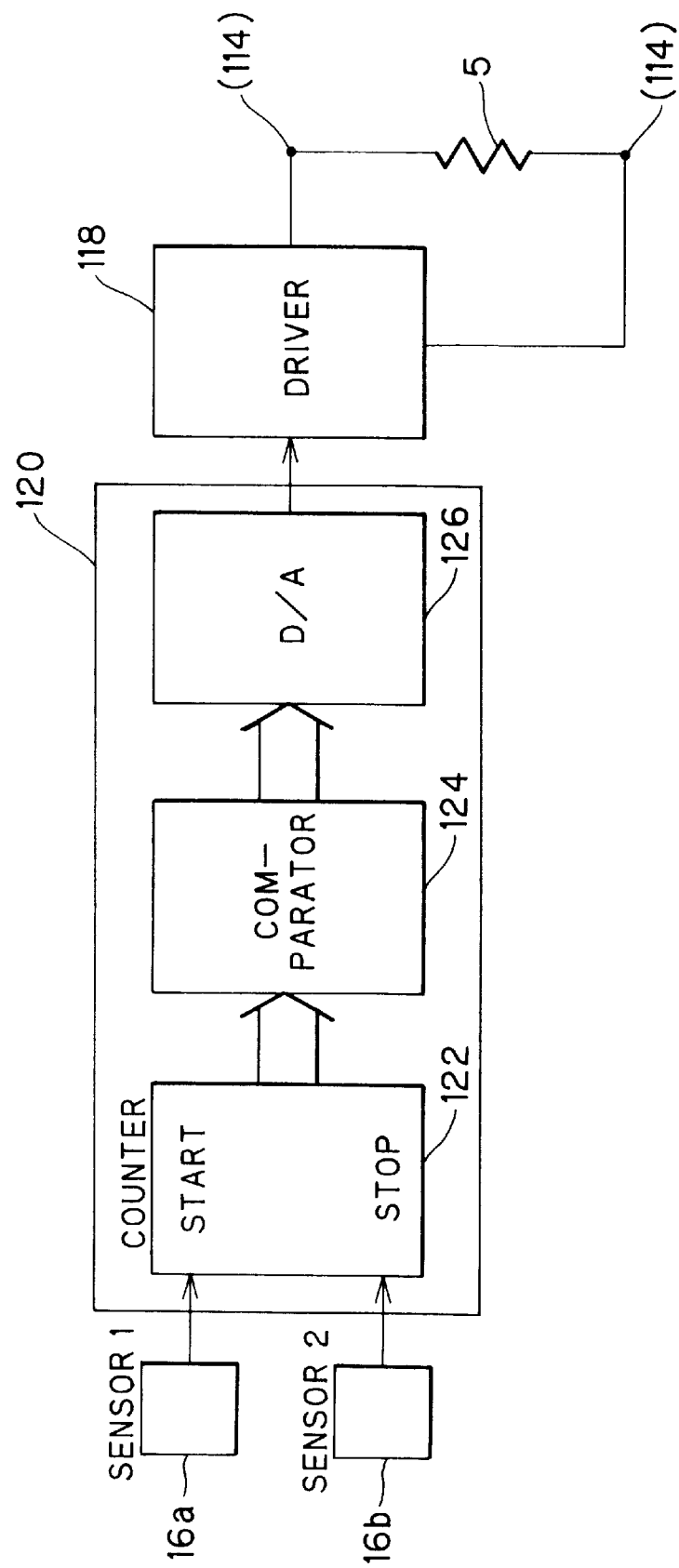
FIG. 15 is a block diagram of a control portion for controlling energization of a torsion spring of the optical scanner of the third embodiment.

As shown in FIG. 14, according to the present embodiment, a pair of optical sensors 116a and 116b are located so as to be capable of receiving the light beam scanned by the optical scanner 100. The pair of optical sensors 116a and 116b are separated from each other by a certain amount of distance along the light scanning direction. When the light beam scanned by the optical scanner 100 reaches the optical sensor 116a, the optical sensor 116a detects the light beam and output a detection signal. When the light beam scanned by the optical scanner 100 reaches the optical sensor 116b, the optical sensor 116b detects the light beam and output a detection signal. As shown in FIG. 15, the pair of optical sensors 116a and 116b are electrically connected to a controller 120. The optical sensors 116a and 116b supply detection signals to the controller 120 when they receive the scanned light beam.

As shown in FIG. 15, the controller 120 includes: a counter 122; a comparator 124; and a digital/analog converter 126. The counter 122 is for digitally counting a time period between when the optical sensor 116a detects the light beam and when the optical sensor 116b detects the light beam. This time period therefore indicates a scanning speed of the light beam. The comparator 124 is for comparing the counted time period with a predetermined value, thereby detecting a change in the laser beam scanning speed. The comparator 124 outputs a digital signal indicative of the compared result, i.e., the scanning speed change. The digital/analog converter 126 is for receiving the digital signal from the comparator 124, and for converting the digital signal into an analog signal. The digital/analog converter 126 supplies the analog signal to the driver 118, which in turn controls energization to the torsion spring 5 based on the analog signal. That is, the driver 118 supplies the torsion spring 5 with an electric current of an amount which is proportional to the scanning speed change, i.e., the difference between the measured time period and the predetermined value.

Figure 16:
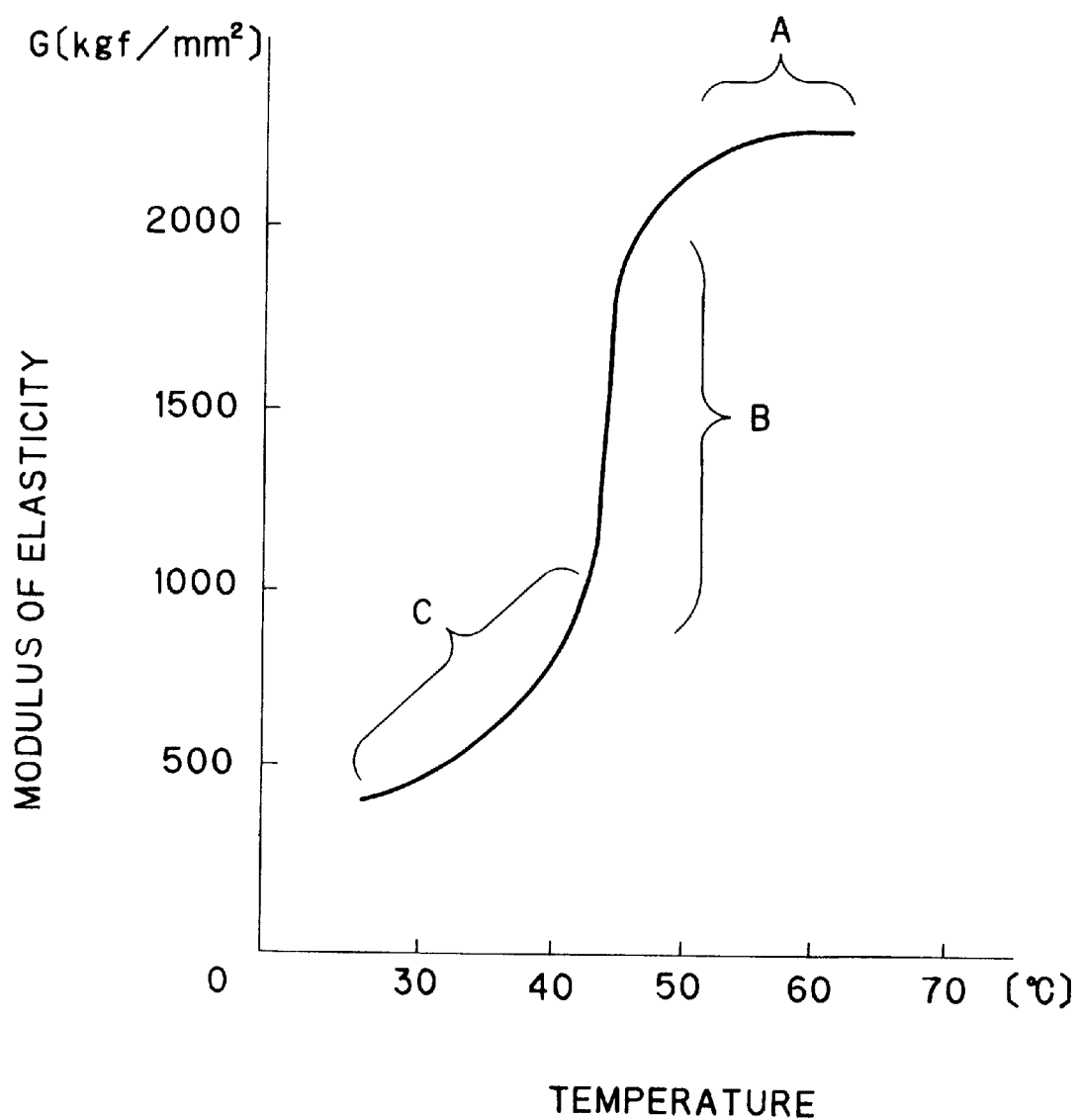
FIG. 16 briefly illustrates how a modulus of elasticity of the shape-memory alloy changes according to an ambient temperature.

FIG. 16 briefly shows how the modulus of elasticity in the shape-memory alloy changes according to the ambient temperature. According to the first and second embodiments, the torsion spring 5 is used when the torsion spring 5 is in the state where the modulus of elasticity changes little in accordance with the ambient temperature. In the case where the modulus of elasticity changes little in the state A, the torsion spring 5 is used in the state A.

Contrarily, according to the present embodiment, the torsion spring 5 is used in the state B where the modulus of elasticity greatly changes in accordance with the temperature or in the state C where the modulus of elasticity changes at a proper amount of degree in accordance with the temperature. Accordingly, when the torsion spring 5 is energized by the driver 18 to be heated up to a slightly higher temperature, the modulus of elasticity greatly increases. As a result, the natural frequency of the oscillating system 200 also increases. On the other hand, when the energization is stopped, the temperature of the torsion spring 5 decreases, whereupon the modulus of elasticity greatly deceases and the natural frequency also decreases.

Thus, through controlling the driver 18, it is possible to maintain fixed the natural frequency of the oscillating system 200. The natural frequency is kept equal to the frequency of the alternating magnetic field. The oscillating system 200 can therefore continue resonating to scan the light beam with a large scanning width.

In the above-description, the torsion spring 5 is made of Ni—Ti alloy. However, the torsion spring 5 may be comprised of other various shape-memory alloys which have modulus of elasticity changing according to the temperature. Representative examples of the shape-memory alloys include Ni—Ti alloy, Cu—Zn alloy, Ag—Cd alloy, Au—Cd alloy, Cu—Sn alloy, Cu—Al—Ni alloy, Ni—Al alloy, and Fe—Pt alloy similarly as in the first and second embodiments. The torsion spring 5 may be comprised of other various materials with their modulus of elasticity changing according to the temperature.

In the above description, control is provided for making closer, to the predetermined value, the time period between the time period detected by the pair of optical sensors 116a and 116b. However, an optical sensor array may be provided for directly measuring a scanning width. The control may be provided for maximizing the measured scanning width.

Or, the optical sensor may be located at a position corresponding to a required minimum scanning width. When the scanning width decreases so that the scanned laser beam will not be detected by the optical sensor, the torsion spring 5 will be energized to increase the scanning width. In this case, it is sufficient to provide only one optical sensor to the optical scanner 100.

In the present embodiment, the fixing jigs 112 are made of the insulating material POM. The fixing jigs 112 can electrically insulate the frame 1 from the energized torsion spring 5. However, the entire frame 1 can be made of an insulation material such as the POM, ceramic, and the like.

Figure 17:
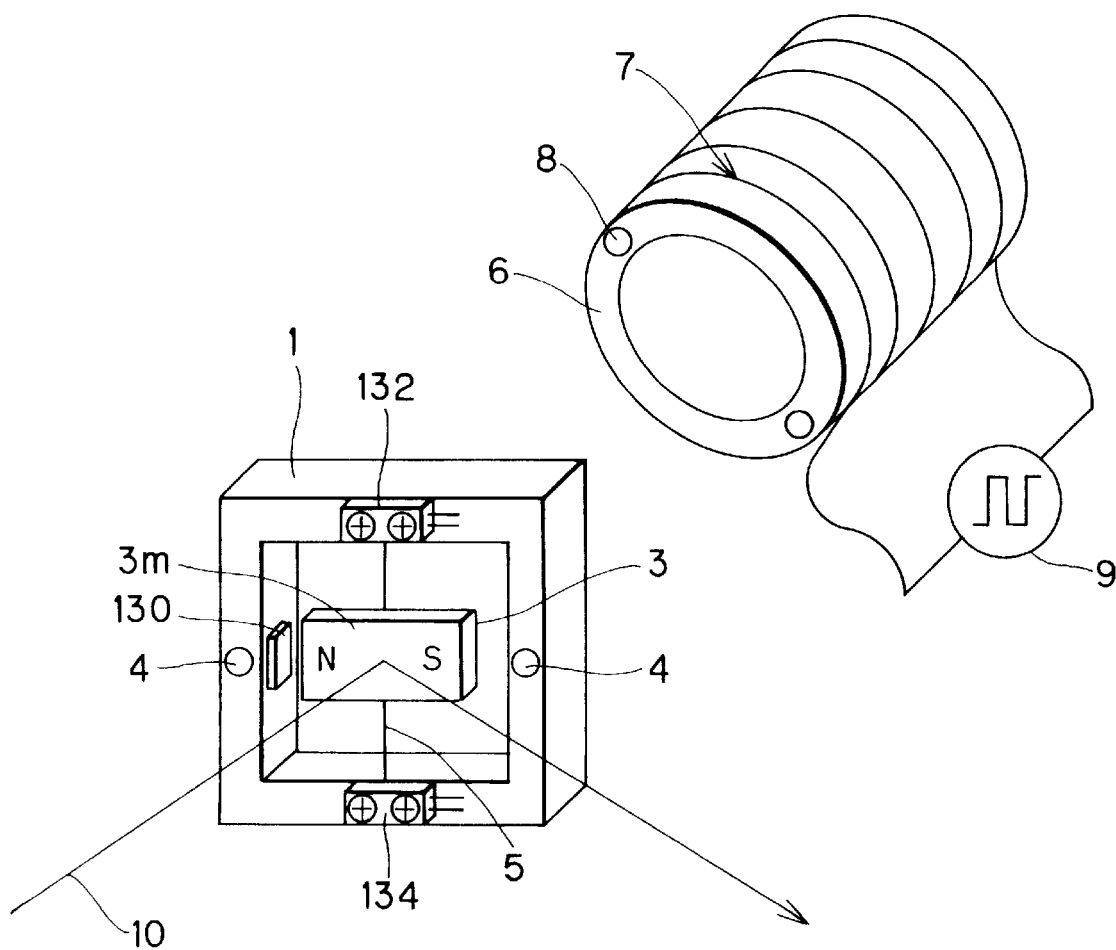
FIG. 17 is a perspective view showing an optical scanner of a modification of the third embodiment where a frame and a coil are separated from each other.

A modification of the present embodiment will be described below with reference to FIG. 17.

In the present modification, the fixing jigs 112 are not used for fixedly securing the torsion spring 5 to the frame 1. The upper end of the torsion spring 5 is fixedly secured to the frame 1 via a heat generating body 132, and the lower end is fixedly secured to the frame 1 via a Pertier-effect element 134. The heat generating body 132 and the Pertier-effect element 134 are for changing the temperature of the torsion spring 5. A Hall-effect sensor 130 is provided in the vicinity of the magnet 3 for measuring an angular speed of the magnet 3. The Hall-effect sensor 130 is electrically connected to a control circuit (not shown in the drawing) for energizing the heat generating body 132 and the Pertier-effect element 134 based on the results detected by the sensor 130. The sensor 130 and the control circuit cooperate to control the temperature of the torsion spring 5.

The Hall-effect sensor 130 is for measuring change in the strength of the magnetic flux due to the oscillation of the magnet 3. The Hall-effect sensor 130 measures a changing amount, a difference between a maximum strength and a minimum strength, of the magnetic flux within one time period. The large changing amount indicates a large scanning width. That is, the large changing amount indicates that the magnet 3 oscillates in a resonant mode. A possible maximum value of the changing amount is determined as a reference value. The control circuit (not shown) calculates a difference between the measured changing amount and the reference value, and outputs a signal in proportion to the calculated difference. The control circuit supplies the signal to either one of the heat generating body 132 and the Pertier-effect element 134 so as to energize the heat generating body 132 or the Pertier-effect element 134 by an amount proportional to the calculated difference. Which of the heat generating body 132 and the Pertier-effect element 134 is energized is determined based on whether or not the presently-measured changing amount becomes closer to the reference value relative to the latest-measured changing amount.

In the present modification, the torsion spring 5 is not only heated but also cooled. Accordingly, the temperature of the torsion spring 5 can be changed to a desired value within a shorter period of time. Because the Hall-effect sensor 130 is employed for measuring the rotational angle of the magnet 3, the entire optical scanner 100 can be made more compact.

In this modification, the heat generating body 132 is provided to one end of the torsion spring 5, and the Pertier-effect element 134 is provided to the other end. However, both the heat generating body 132 and the Pertier-effect element 134 may be provided to each end. In this case, a control can be attained with a higher speed.

Figure 18:
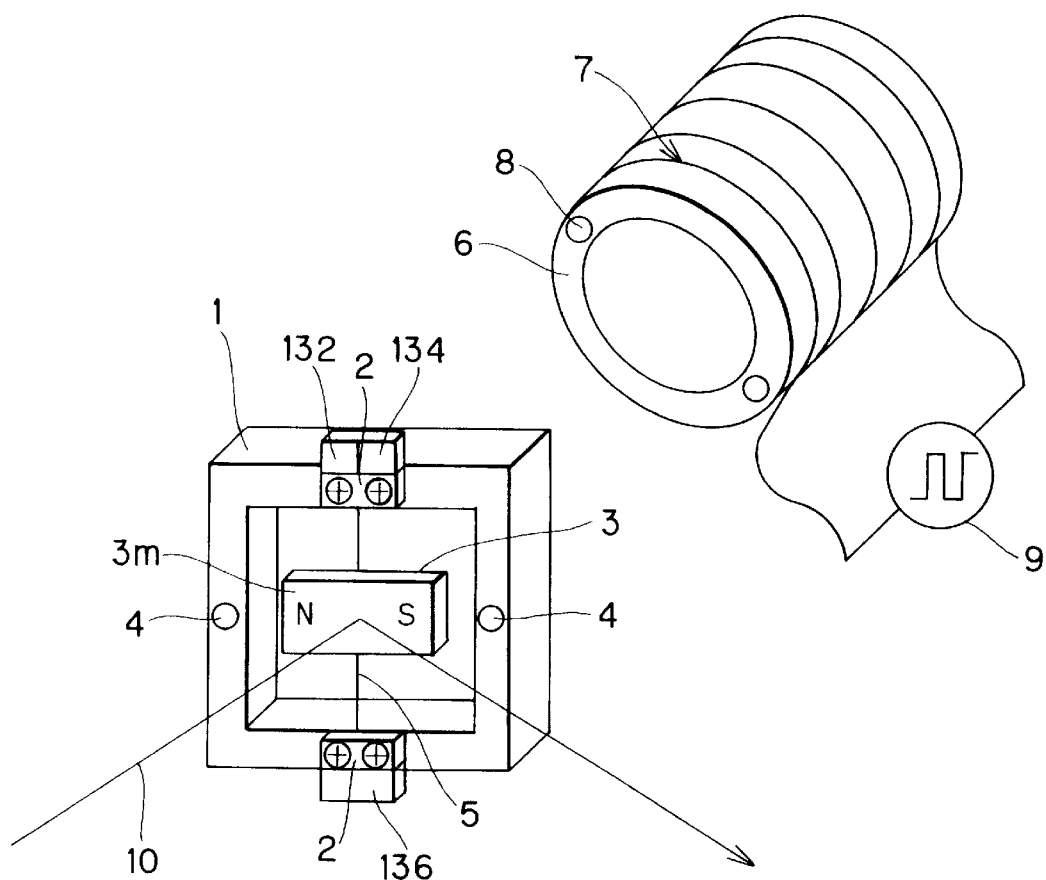
FIG. 18 is a perspective view showing an optical scanner of another modification of the third embodiment where a frame and a coil are separated from each other.

Another modification will be described below with reference to FIG. 18.

In the present modification, the upper and lower ends of the torsion spring 5 are fixedly secured to the frame 1 with the jigs 2 in the same manner as in the first embodiment. Both the heat generating body 132 and the Pertier-effect element 134 are attached to the upper end of the torsion spring 5. A thermistor 136 is attached to the lower end of the torsion spring 5. The thermistor 136 is for measuring a temperature of the torsion spring 5.

When assembling the optical scanner 100, a reference temperature is selected so that the natural frequency of the assembled optical scanner 100 will be equal to the frequency of the alternating magnetic field. The reference temperature is thus determined dependent on possible errors included in the external size of the torsion spring 5 and possible positional erroneous shifts of the torsion spring 5 from the desired position. Accordingly, after the reference temperature is set once as described above, the resonance frequency of the torsion spring 5 can be maintained fixed simply through maintaining the temperature of the torsion spring 5 at the reference temperature.

In the present modification, a control circuit (not shown in the drawing) receives a measured result of the thermistor 136. The control circuit then energizes the heat generating body 132 or the Pertier-effect element 134 so that the temperature of the torsion spring 5, as measured by the thermistor 136, will become close to the reference temperature. It is therefore possible to maintain the resonance frequency of the oscillating system 200 at the fixed value.

Because the temperature sensor (thermistor 136) is used for directly measuring the temperature, the control circuit can be made simple, relative to the control circuits provided as described above for performing a control based on the measured rotational angle and rotational angular speed. Because the thermistor 136 is inexpensive, the entire optical scanner 100 can be produced less costly.

In this modification, the thermistor 136 is employed as the temperature sensor. However, other various types of temperature sensors can be employed. For example, a thermocouple can be used. In this case, the entire optical scanner 100 can be made more compact.

Figure 20:
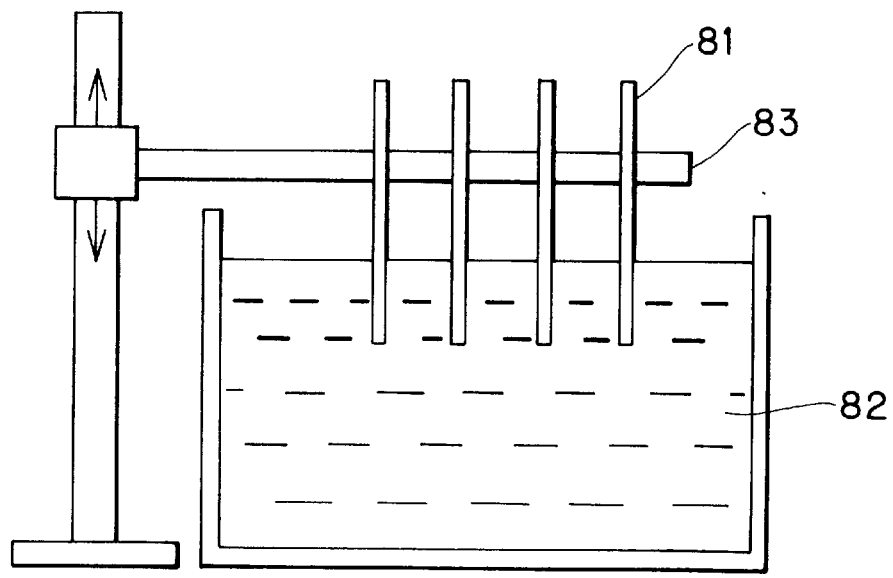
FIG. 20 illustrates how the fixing portions of the torsion spring is produced through an electroless plating process.
Figure 21:
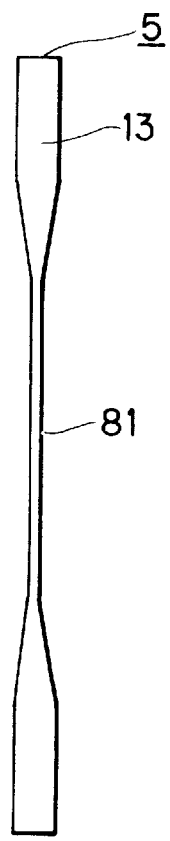
FIG. 21 illustrates a torsion spring with its fixing portions having a large diameter relative to its remaining portions.

An optical scanner according to a fourth preferred embodiment of the present invention will be described while referring to FIGS. 19 through 21.

The present embodiment is provided in order to prevent the torsion spring 5 from being broken at the portions where the torsion spring 5 is fixed to the frame 1. The present embodiment therefore increases the diameter of the torsion spring 5 at the portions where the torsion spring 5 is connected to the frame 1 so that the diameter becomes larger than that of the portion of the torsion spring 5 where the magnet 3 is attached.

Figure 19:
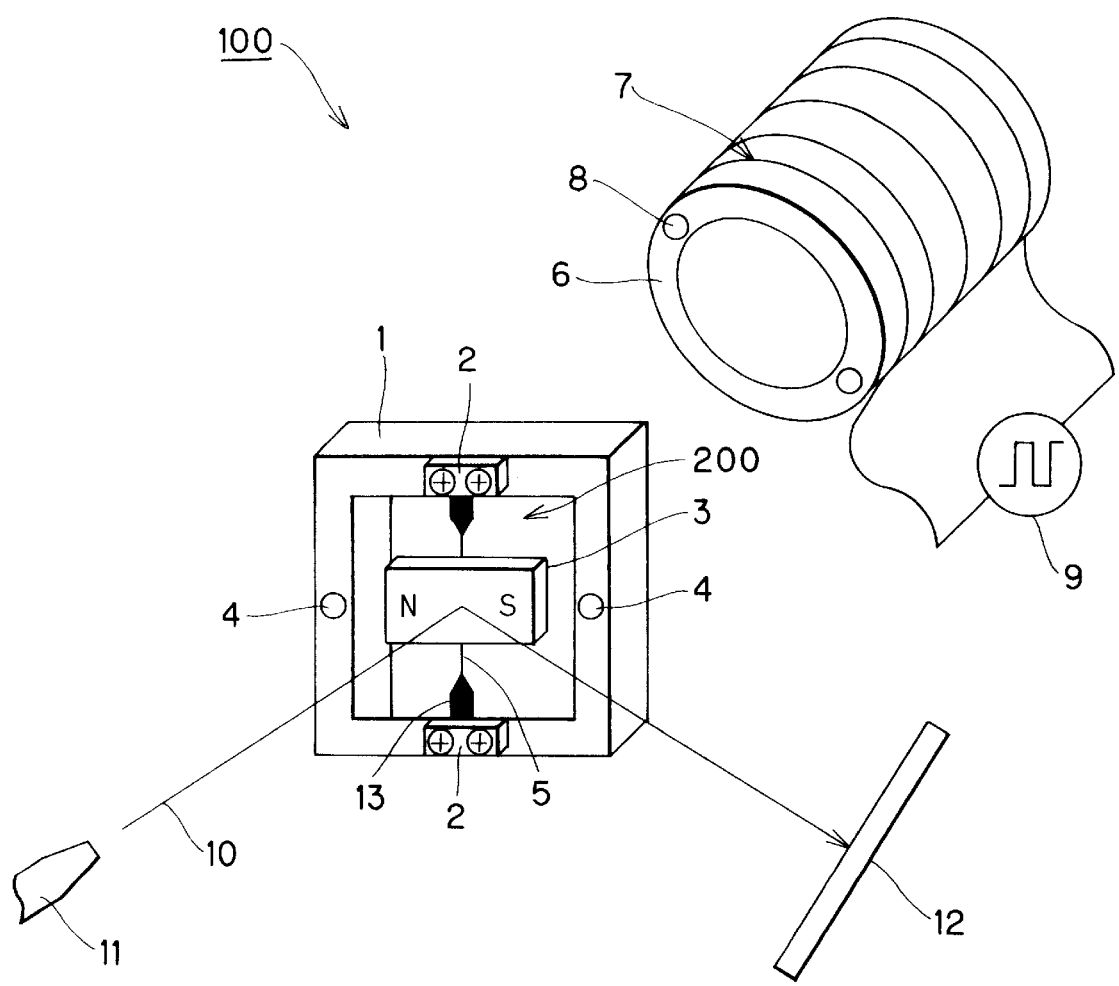
FIG. 19 is a perspective view showing an optical scanner of a fourth embodiment according to the present invention where a frame and a coil are separated from each other.

As shown in FIG. 19, in an optical scanner 100 of the present embodiment, the torsion spring 5 has upper and lower fixing portions 13 where the torsion spring 5 is connected to the upper and lower sides of the frame 1. The diameter of the fixing portions 13 is larger than that of the central portion of the torsion spring 5 where the magnet 3 is attached. Except for this point, the optical scanner 100 is the same as that of the first embodiment.

According to the present embodiment, the diameter of the fixing portions 13 is increased through an electroless plating method. That is, the torsion spring 5 is coated with an electroless plating film at the fixing portions 13. The material of the electroless plating film is selected in accordance with the material of the torsion spring 5. When the torsion spring 5 is made from Ni—Ti alloy, for example, the torsion spring 5 may be coated with a nickel (Ni) at the fixing portions 13. The fixing portions 13 can therefore be produced easily and inexpensive.

Following will be given a detailed description of a method of producing the torsion spring 5 with the fixing portions 13.

When it is desired to produce several torsion springs 5, several shape-memory alloy rods 81 are first prepared. Then, both ends of each shape-memory alloy rod 81 is subjected to a pre-treatment such as an alkali degreasing treatment and an acid-activation process. Then, as shown in FIG. 20, each shape-memory alloy rod 81 is held by a holding unit 83 so that one end of the shape-memory alloy rod 81 is immersed in a bath containing a plating liquid 82. The plating liquid 82 can be prepared from a general type of electroless plating liquid such as Ni—P, Ni—B, and the like. According to the electroless plating method, a film is deposited on the shape-memory alloy rod 81 at a plating speed in the range of 15 to 20 micrometers/hr at a bath temperature in the range of 85 to 95 degrees (° C.) and at a pH of about 4.5. The plating speed can be adjusted through changing the plating liquid in the bath.

When the end of the shape-memory alloy rod 81 is thus immersed in the plating liquid 82 for a predetermined period, a film of a desired thickness is coated on the immersed end of the rod 81. Next, the other end of the shape-memory alloy rod 81 is immersed in the plating liquid 82 for the predetermined period in the same way, so that a film of the desired thickness is coated on that end of the rod 81. Thus, a torsion spring 5 is produced with its both fixing portions 13 having a desired diameter as shown in FIG. 21. The diameter of the fixing portion 13 may be selected in the range of 50 micrometers to 1 millimeter. The diameter should be selected in accordance with the original diameter of the shape-memory alloy rod 81 and in accordance with how the torsion spring 5 will be used.

It is preferable not to produce a step portion between the fixing portion 13 and the non-film-plated central portion of the torsion spring 5. The plating film is preferably formed in a tapered shape on the shape-memory alloy rod 81. Accordingly, the holding unit 83 is designed so as to be movable upwardly and downwardly. The shape-memory alloy rod 81 is moved gradually in an upward direction while being immersed in the plating liquid 82. Thus produced torsion spring 5 has a diameter gradually increasing from the central portion toward the fixing portions 13. The thus tapered-shaped fixing portions 13 will prevent the stress from being concentrated to a single point. The torsion spring 5 will not be broken.

It is very difficult to accurately produce the fixing portions 13 in a desired length through the above-described method. Accordingly, the fixing portions 13 may be produced in a length longer than a desired length through the above-described method. Then, the fixing portions 13 may be cut into the desired length.

It is noted that the electroless-plated film Ni—P is hardened through a thermal treatment. Especially when it is desired to harden the fixing portions 13, the electroless-plated portion of the shape-memory alloy rod 81 may be further subjected to the thermal treatment at about 300 degrees (° C.) for about an hour. Thus thermal treatment-subjected fixing portions 13 will present a high degree of hardness, that is, a Vickers hardness in the range of 900 to 1,000. It is noted that because the shape-memory effect may change according to the thermal treatment, only the fixing portions 13 should be subjected to the thermal treatment.

In the above-described method, after one end of the shape-memory alloy rod 81 is immersed in the plating liquid 82 and is plated with the film, the other end is immersed in the plating liquid 82 and is plated with the film. However, the shape-memory alloy rod 81 may be bent at its central portion, and both ends of the shape-memory alloy rod 81 may be immersed in the plating liquid 82 simultaneously. Both ends of the rod 81 can be plated with the Ni—P film simultaneously.

In the above description, the electroless-plating method is employed for producing the fixing portions 13. However, other various methods can be employed. For example, a ceramic spraying method, a metal spraying method, a resin coating method, an electroplating method, and the like can be employed.

It is noted that the torsion spring 5 with the fixing portions 13 may not be made only from Ni—Ti alloy but also from other various kinds of shape-memory alloy such as Cu—Zn alloy, Ag—Cd alloy, Au—Cd alloy, Cu—Sn alloy, Cu—Al—Ni alloy, Ni—Al alloy, and Fe—Pt alloy similarly to the first and second embodiments.

An optical scanner according to a fifth preferred embodiment of the present invention will be described while referring to FIGS. 22 and 23.

According to the first through fourth embodiments, the torsion spring 5 and the magnet 3 are mounted to the frame 1, and then the frame 1 is attached to the coil 7. According to the present embodiment, the torsion spring 5 and the magnet 3 are directly mounted to the coil 7.

Figure 22:
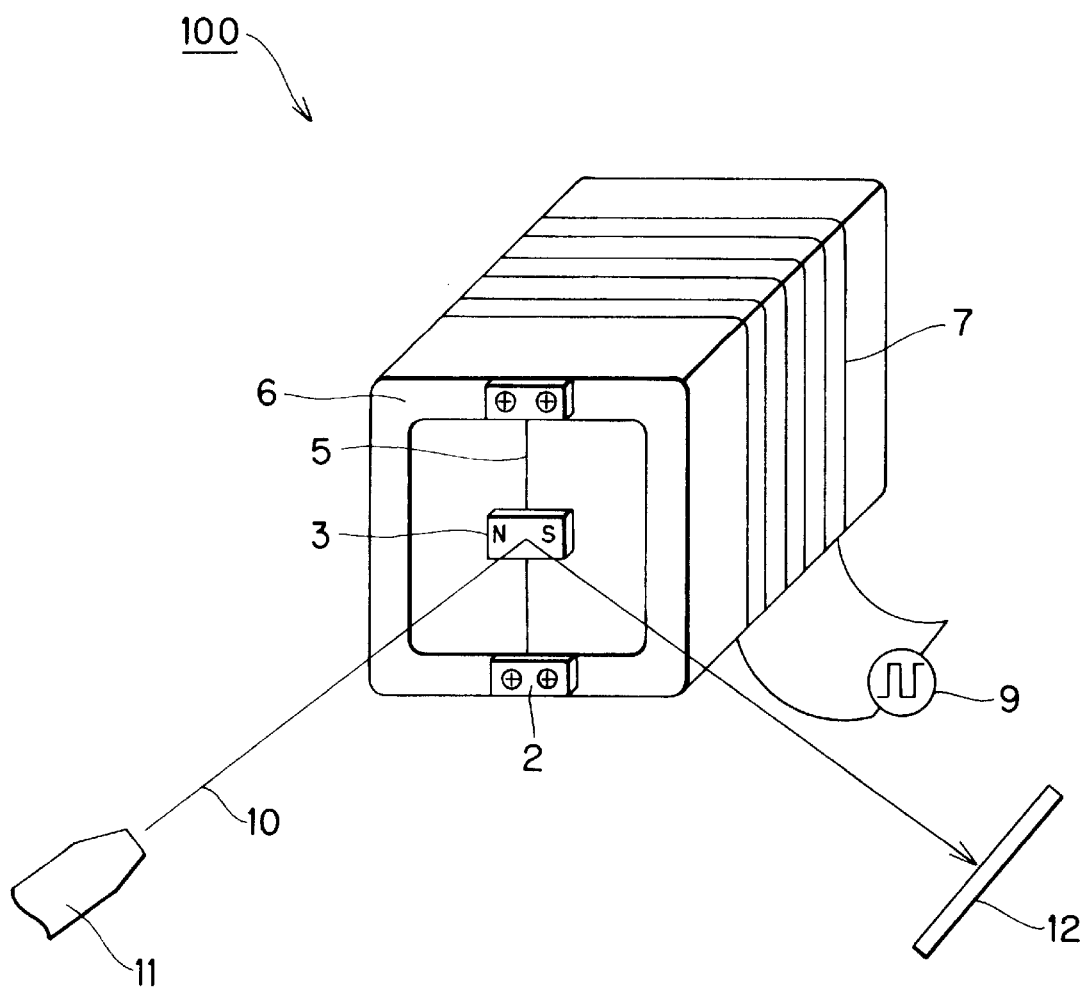
FIG. 22 is a perspective view showing an optical scanner of a fifth embodiment according to the present invention.

As shown in FIG. 22, in an optical scanner 100 of the present embodiment, the core 6 is produced into a rectangular shape. The core 6 has a rectangular-shaped through-hole. The torsion spring 5 is pulled with the certain amount of tension before being secured to one end of the core 6. In more concrete terms, the upper and lower ends of the torsion spring 5 are fixedly secured, via the pair of jigs 2, to upper and lower sides of the core 6 at the end thereof. Thus, the torsion spring 5 and the magnet 3 are located in the through-hole at the end of the core 6. Except for this point, the optical scanner 100 has the same structure as that of the first embodiment.

It is noted that the material with a high permeability, such as a ferrite, may be provided inside the core 6. The torsion spring 5 may be provided in the inside of the core 6.

It is noted that the torsion spring 5 may be made from various kinds of shape-memory alloy such as Ni—Ti alloy, Cu—Zn alloy, Ag—Cd alloy, Au—Cd alloy, Cu—Sn alloy, Cu—Al—Ni alloy, Ni—Al alloy, and Fe—Pt alloy similarly as in the first and second embodiments.

Figure 23:
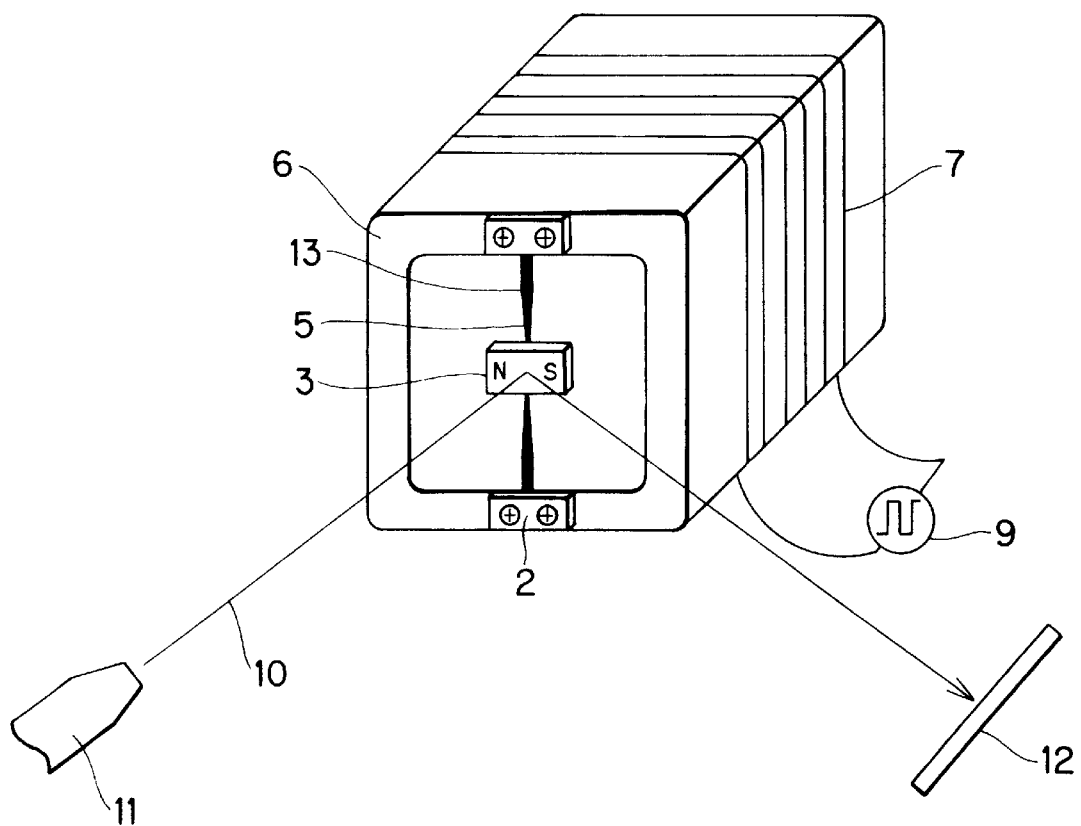
FIG. 23 is a perspective view showing an optical scanner of a modification according to the fifth embodiment.

The torsion spring 5 may be constructed as shown in FIG. 23 to have the thick fixing portions 13 in the same manner as in the fourth embodiment.

As described above, according to the present embodiment, the magnet 3 and the torsion spring 5 are directly attached to the coil 7. The frame 1 used in the first through fourth embodiments are omitted. Accordingly, the entire optical scanner 100 can be made compact. Additionally, the magnet 3 can be located very close to the coil 7. The coil 7 can therefore apply a magnetic field of a larger strength to the magnet 3.

An optical scanner according to a sixth preferred embodiment of the present invention will be described while referring to FIGS. 24 through 32.

According to the above-described embodiments, the torsion spring 5 has a circular cross-section and has a small diameter. The magnet 3 also has a small amount of vertical width (about 3 to 6 mm). The contact area, at which the magnet 3 is contacted with the torsion spring 5, is not so large. Accordingly, the adhesive agent is provided between the magnet 3 and the torsion spring 5 to apply a large amount of adhesive force between the magnet 3 and the torsion spring 5. The adhesive force acts against the rotational force, produced by the alternating magnetic field, so that the magnet 3 will not be separated from the torsion spring 5.

Figure 24:
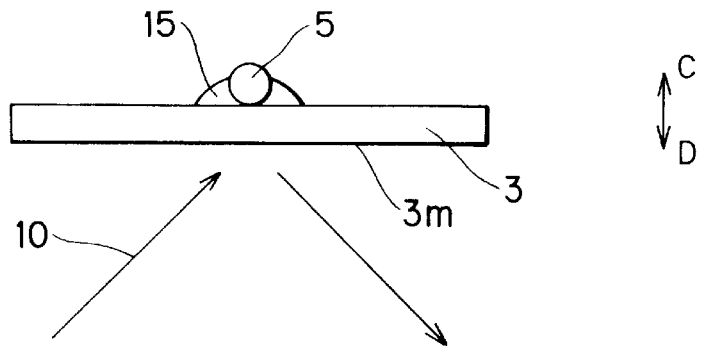
FIG. 24 is a cross-sectional view where a torsion spring 5 of a circular cross-section is attached to a magnet.

More specifically, as shown in FIG. 24, the magnet 3 has a plain surface at which the magnet 3 is contacted with the torsion spring 5. As apparent from the figure, the magnet 3 and the torsion spring 5 are contacted with each other only at one point. The adhesive agent 15 is therefore provided between the magnet 3 and the torsion spring 5. The adhesive force of the adhesive agent 15 acts against the rotational force which is repeatedly generated by the alternating magnetic field in a direction indicated by an arrow CD. The adhesive agent 15 prevents the torsion spring 5 and the magnet 3 from being separated from each other.

The present embodiment is provided in order to more reliably prevent the torsion spring 5 and the magnet 3 from separating from each other even when the torsion spring 5 and the magnet 3 are rotated at a very large oscillation angle with a very high speed.

Figure 25:
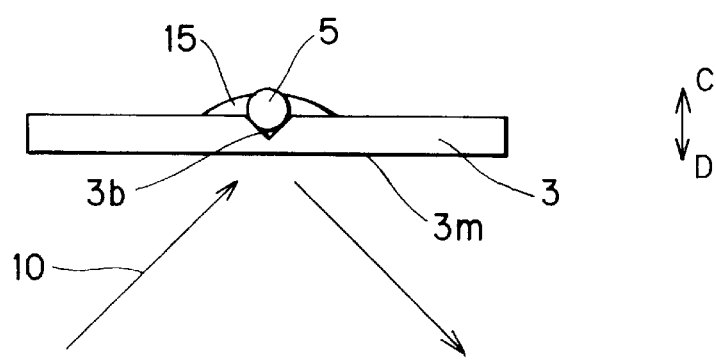
FIG. 25 is a cross-sectional view showing one method where a torsion spring 5 of a circular cross-section is attached to a magnet.
Figure 26:
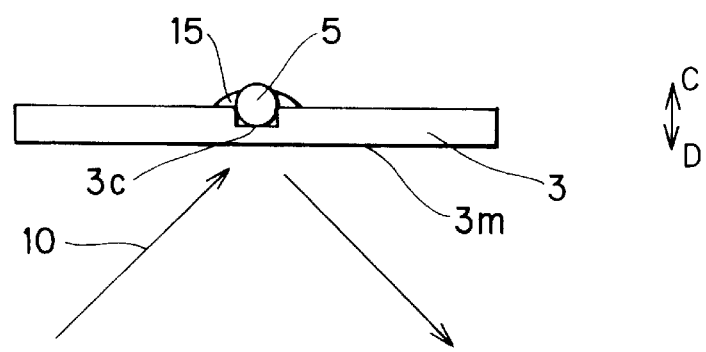
FIG. 26 is a cross-sectional view showing another method where a torsion spring 5 of a circular cross-section is attached to a magnet.

According to one method, the contact area between the magnet 3 and the torsion spring 5 is increased through forming a recess 3b or 3c in the magnet 3 as shown in FIG. 25 or FIG. 26. An adhesive agent 15 of high quality is provided between the magnet 3 and the torsion spring 5.

According to another method, the torsion spring 5 is produced to have a substantially planar surface at which the magnet 3 is contacted as shown in FIGS. 27 through 32.

Figure 27:
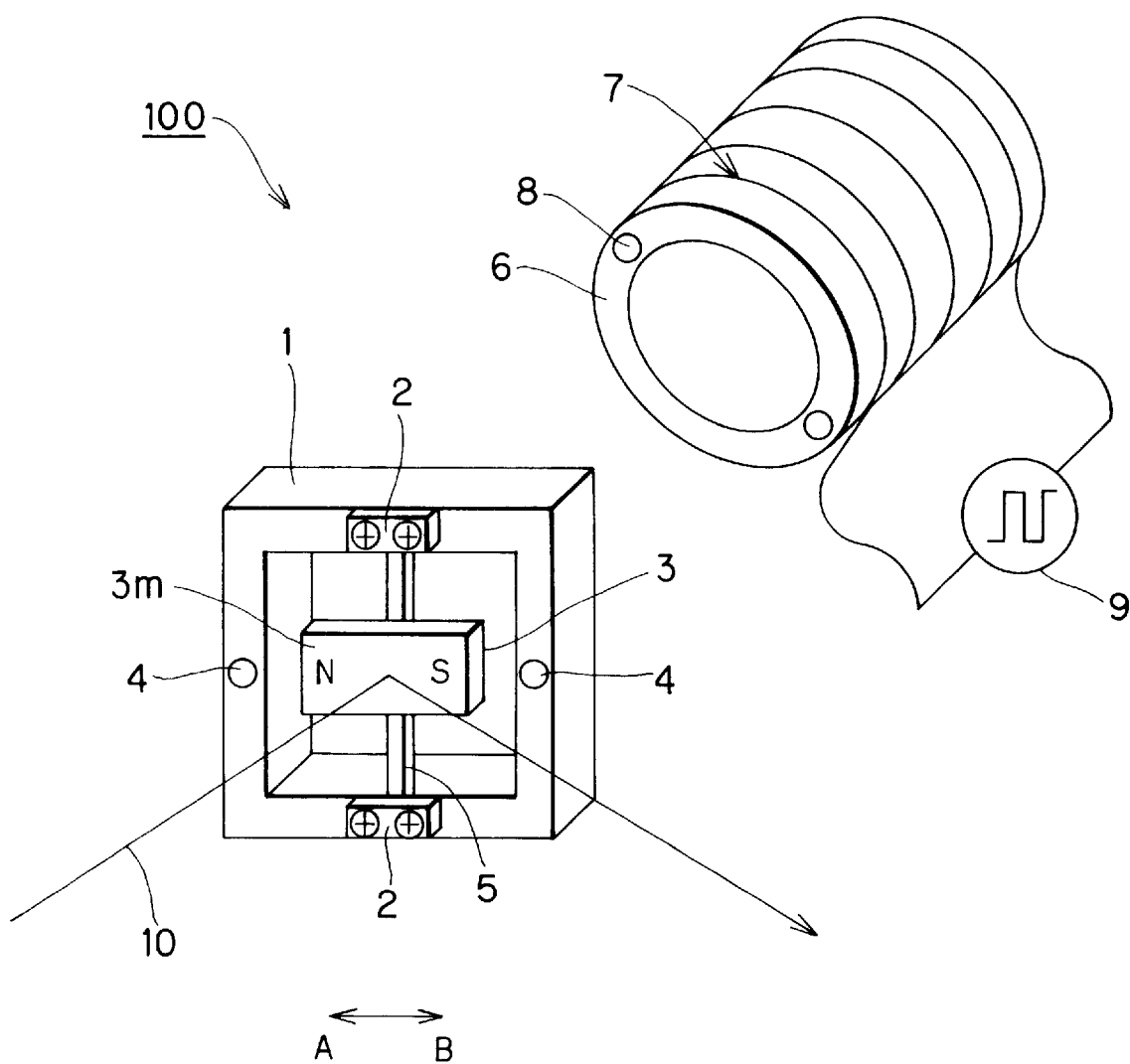
FIG. 27 is a perspective view showing an optical scanner of an example of a sixth embodiment according to the present invention.
Figure 28:
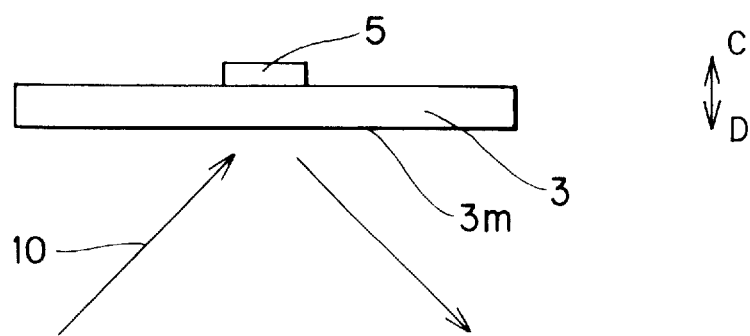
FIG. 28 is a cross-sectional view where a torsion spring of FIG. 27 is attached to a magnet.

According to one example shown in FIGS. 27 and 28, the torsion spring 5 is produced to have a rectangular cross-section. This shape can be produced through drawing the torsion spring 5 from a Ni—Ti alloy wire of a circular-cross section. It is noted that a drawing die has to be used for drawing the torsion spring 5 from the Ni—ti alloy wire. The thus produced torsion spring 5 has a thickness of about 80 micrometers and a width of about 300 micrometers, and a length of about 10 millimeters. The torsion spring 5 is attached to the frame 1 via an adhesive with such an orientation that the width of the torsion spring 5 extends along a direction indicated by an arrow AB shown in FIG. 27 and the thickness of the torsion spring 5 extends along a direction indicated by an arrow CD shown in FIG. 28.

Except for the above-described points, an optical scanner 100 constructed in the present embodiment is the same as that in the first embodiment.

Figure 32A:
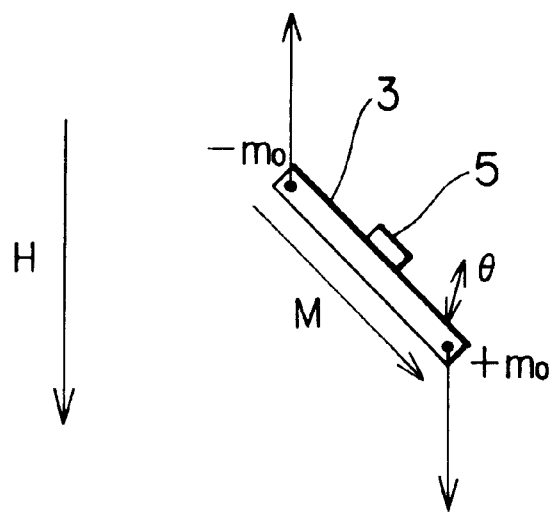
FIG. 32($a$) and 32($b$) show how a magnet in the optical scanner of the sixth embodiment is applied with a torque which is produced by an alternating magnetic field.
Figure 32B:
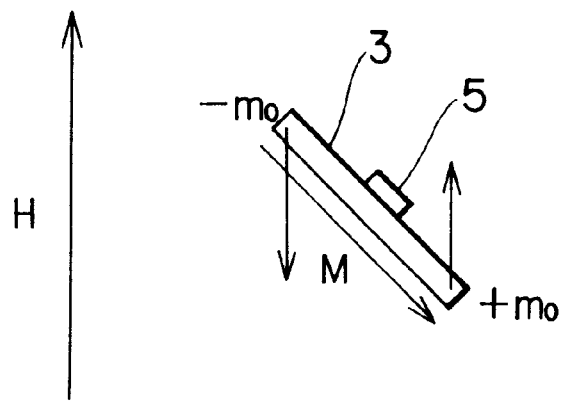

As apparent from FIG. 28, the planar surface of the torsion spring 5 is contacted with the planar surface of the magnet 3. Accordingly, the torsion spring 5 can firmly hold the magnet 3 thereon against the rotational force produced as shown in FIGS. 32(a) and 32(b) by the alternating magnetic field. The torsion spring 5 can therefore hold the magnet 3 thereon with a small amount of adhesive force. The contact area between the magnet 3 and the torsion spring 5 becomes large relative to the case where the torsion spring 5 has the circular cross section. It becomes more reliable that the magnet 3 will not be separated from the torsion spring 5 even when the magnet 3 and the torsion spring 5 are angularly oscillated for a long period of time with a large oscillation angle at a high angular speed.

Figure 29:
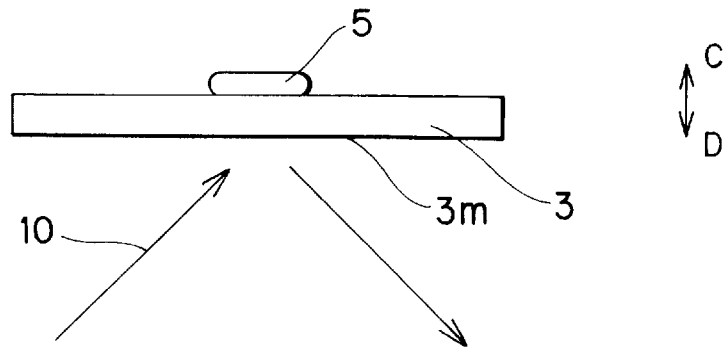
FIG. 29 is a cross-sectional view of another example of a torsion spring attached to a magnet.

According to another example, the torsion spring 5 has a flattened oval cross-section as shown in FIG. 29. This shape can be obtained through subjecting a wire of a circular cross-section to a rolling process. It is unnecessary to use any die contrary to the above-described example. The torsion spring 5 having the flattened oval cross-section can therefore be produced less costly.

Figure 30:
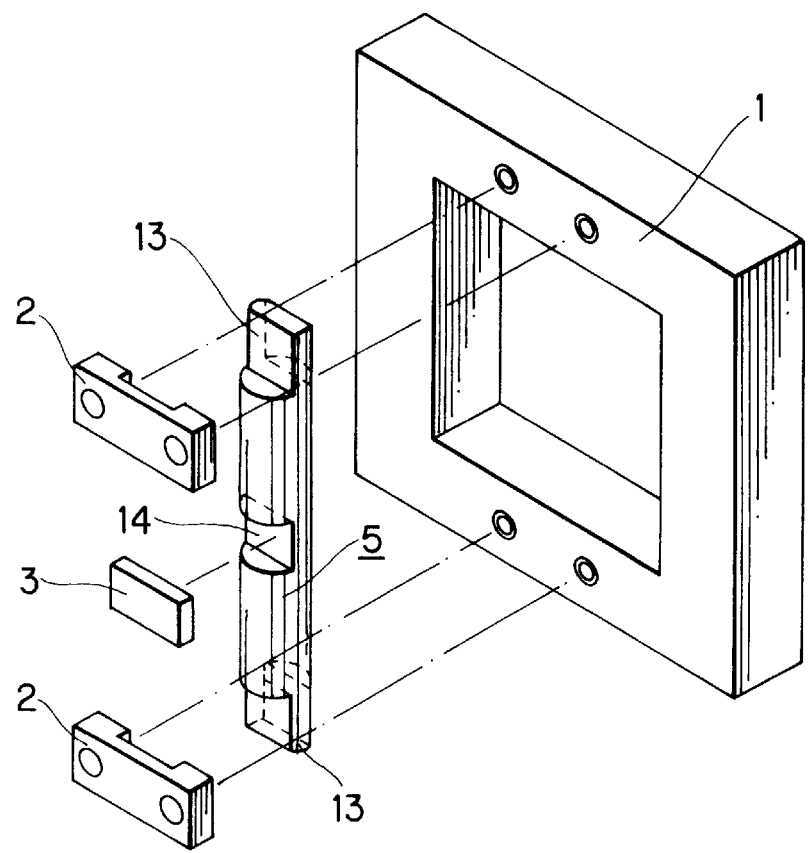
FIG. 30 is a perspective exploded view illustrating how still another example of the torsion spring is attached to the frame and to the magnet.

According to still another example, as shown in FIG. 30, the torsion spring 5, made from a wire of a circular cross-section, is processed at its fixing portions 13 and its magnet holding portion 14 to have planar surfaces. The torsion spring 5 is fixed to the frame 1 at the fixing portions 13. The torsion spring 5 holds the magnet 3 at the magnet holding portion 14.

It is noted that the torsion spring 5 having a circular cross-section can present the same natural frequency with that of the torsion spring 5 having the above-described polygonal or flattened oval cross-section when the diameter of the circular cross-section is smaller than the width of the polygonal or flattened oval cross section. Accordingly, in the torsion spring 5 with the circular cross-section, the contact area between the frame 1 and the torsion spring 5 and the contact area between the torsion spring 5 and the magnet 3 become small. However, the shape shown in FIG. 30 can be produced merely through mechanically processing an easily-available wire of a circular cross-section. Accordingly, the torsion spring 5 of this modification can be produced less costly.

Figure 31:
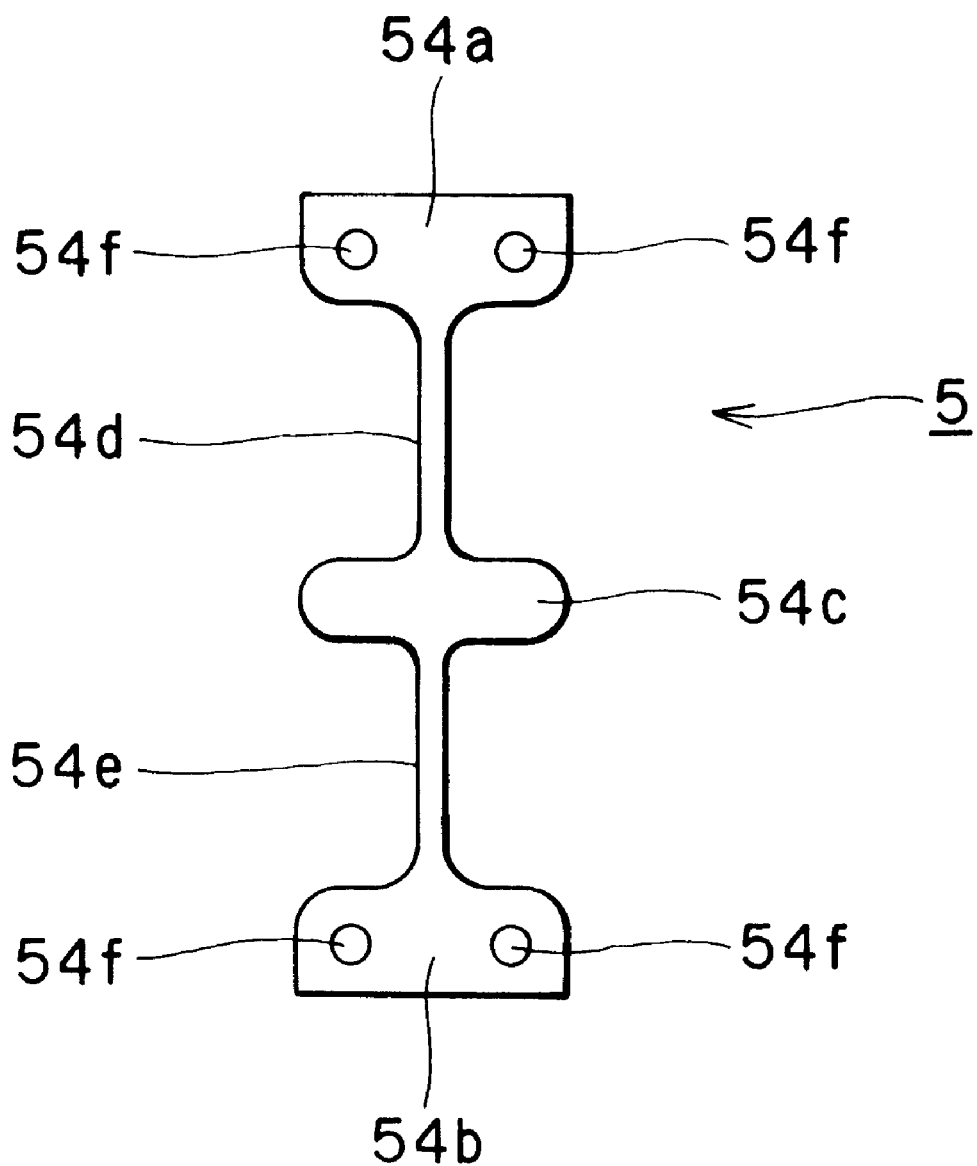
FIG. 31 is a plan view of a further example of the torsion spring.

According to a further example, the torsion spring 5 is produced through etching a Ni—Ti alloy plate into a shape as shown in FIG. 31. The original Ni—Ti alloy plate is thin and has a thickness of about 80 micrometers. The produced torsion spring 5 has spring portions 54d and 54e with a width of about 300 micrometers and fixing ends 54a and 54b and a magnet holding portion 54c which have larger widths than the spring portions 54d and 54e. A pair of through-holes 54f are formed in each of the fixing ends 54a and 54b for being secured to the frame 1 via screws.

With the above-described structure, the torsion spring 5 can be reliably fixed to the frame 1. The torsion spring 5 can reliably hold the magnet 3 thereon. The entire optical scanner 100 can be assembled very easily.

It is noted that the torsion spring 5 can be produced from the thin plate through various methods other than the above-described etching method. For example, the torsion spring 5 can be produced through a pressing process from the thin plate. When the torsion spring 5 is thus produced through those methods from a thin plate, the shape of the torsion spring 5 can be easily and freely selected.

According to the present embodiment, the scanning frequency can be freely selected through changing the width, the thickness, and the length of the torsion spring 5, the mass of the magnet 3, and the other various parameters.

In the above-description, the torsion spring 5 is produced to have a rectangular cross section. However, it is sufficient that the torsion spring 5 be produced to have at least one substantially planar surface. For example, the torsion spring 5 may be produced to have a triangular cross section, a pentagonal cross section, or the like.

In the above-description, the torsion spring 5 is made of Ni—Ti alloy. However, the torsion spring 5 may be comprised of other various shape-memory alloys. Representative examples of the shape-memory alloys include Ni—Ti alloy, Cu—Zn alloy, Ag—Cd alloy, Au—Cd alloy, Cu—Sn alloy, Cu—Al—Ni alloy, Ni—Al alloy, and Fe—Pt alloy similarly as in the first and second embodiments. The torsion spring 5 may be produced from elastic metal other than the shape-memory alloy.

Next will be given another modification of the sixth embodiment with reference to FIGS. 33 through 35.

Figure 33:
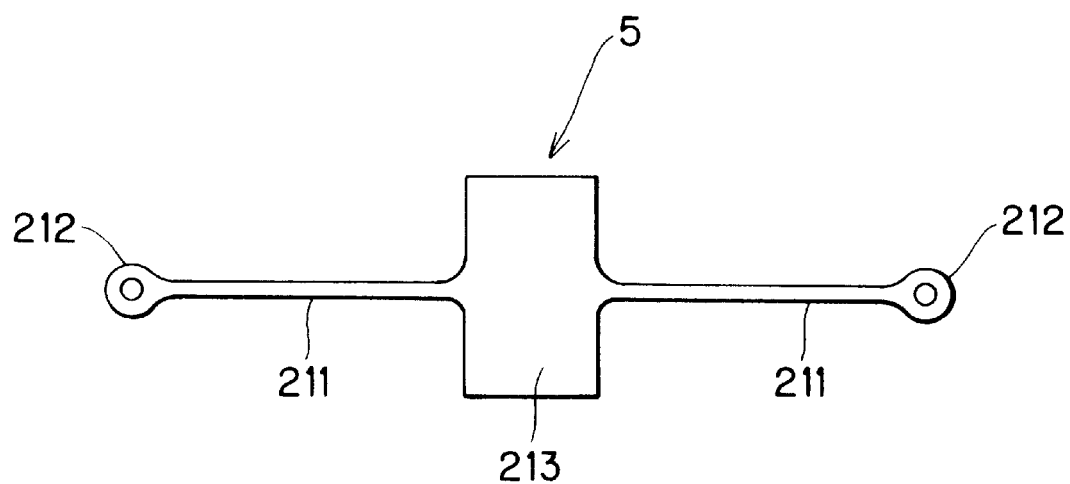
FIG. 33 is a plan view of another modification of the torsion spring of the sixth embodiment.

As shown in FIG. 33, the torsion spring 5 of this modification is made of a Ni—Ti alloy and has a thickness of about 0.2 mm. The torsion spring 5 includes a pair of spring portions 211, a pair of fixing portions 212, and a magnet holding portion 213. Each of the spring portions 211 has a width in the range of about 0.1 mm to 0.4 mm. The fixing portions 212 are provided at both ends of the torsion spring 5, and has a width larger than that of the spring portions 211. Each of the fixing portions 212 is formed with a through-hole. A screw is inserted through the through-hole to fixedly secure the torsion spring 5 to the frame 1 as shown in FIG. 35. The magnet holding portion 213 is formed in the central portion of the torsion spring 5. The magnet holding portion 213 has a shape and size substantially the same as that of the magnet 3. The magnet holding portion 213 has a rectangular shape with a width of about 3 mm and a length of about 6 mm.

The torsion spring 5 of FIG. 33 is produced through an electropolishing method as described below.

Figure 34A:
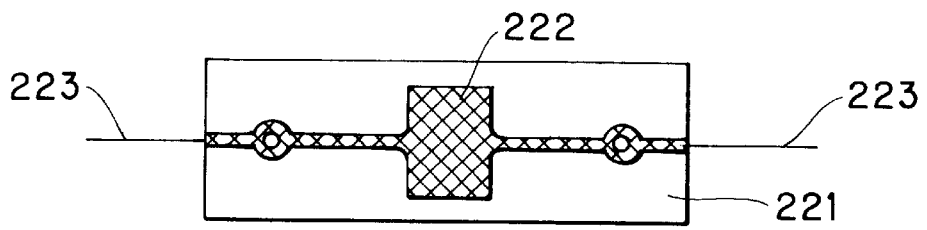
FIG. 34($a$) shows how a resist layer is provided on a Ni—Ti alloy plate.
Figure 35:
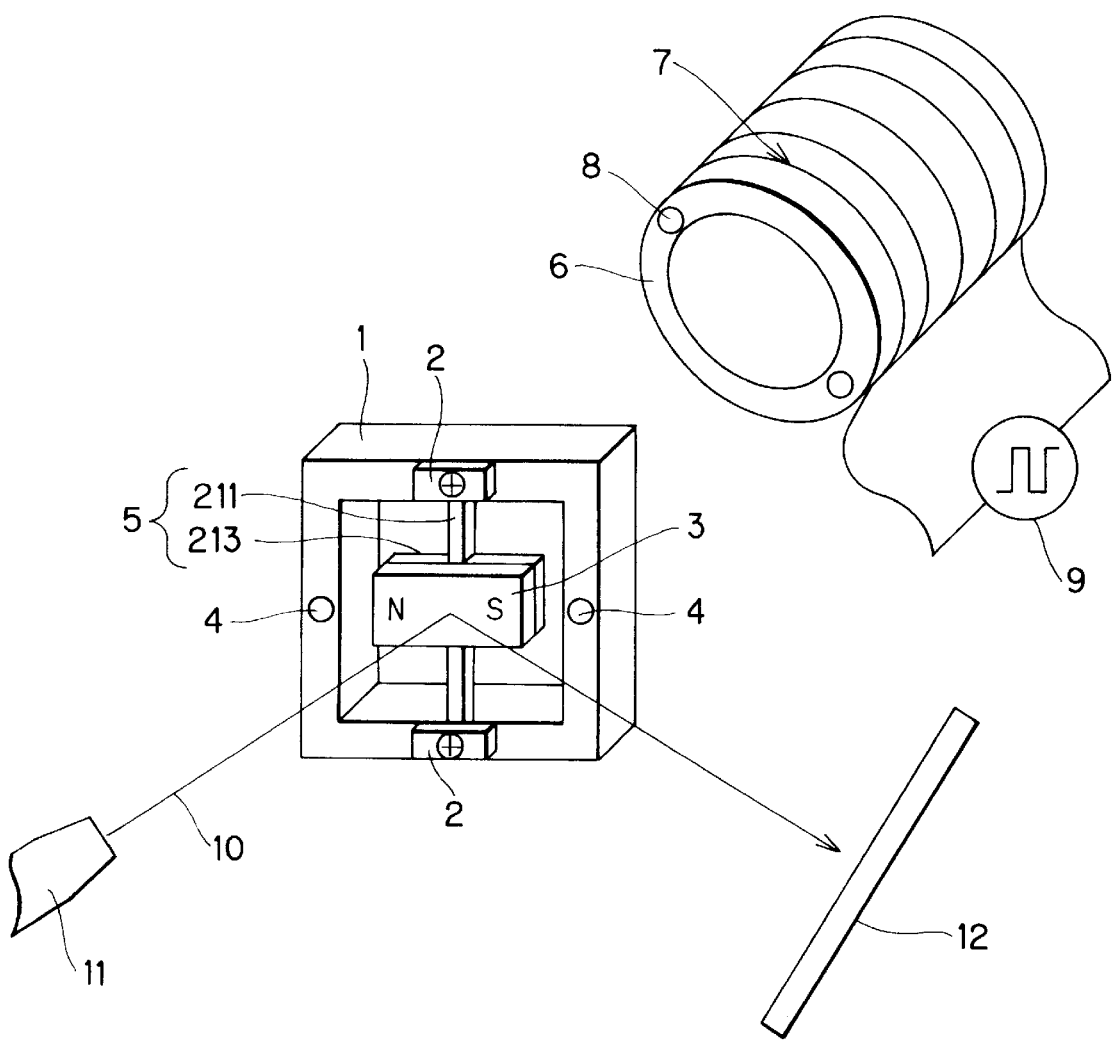
FIG. 35 is a perspective view showing an optical scanner provided with a torsion spring shown in FIG. 33.

First, as shown in FIG. 34(a), a Ni—Ti alloy plate 221 with a width of about 0.2 mm is prepared, and a resist layer 222 is provided on the Ni—Ti alloy plate 221. The resist layer 222 has a shape the same as that of the torsion spring 5 desired to be obtained. A pair of lead wires 223 are connected to the Ni—Ti alloy plate 221. It is noted that the resist layer 222 extends further to the lead wires 223. The number of the lead wires 223 is preferably as high as possible in order to uniformly electropolish the Ni—Ti alloy plate 221. However, it is possible to perform the electropolishing operation when at least one lead wire 223 is connected to the Ni—Ti alloy plate 221. The lead wire 223 may be provided to any position on the Ni—Ti alloy plate 221. In this example shown in FIG. 34(a), the lead wires 223 are provided in connection with the fixing portions 212 of the torsion spring 5. It is noted that FIG. 34(a) shows that the resist layer 222 is provided on one side of the Ni—Ti alloy plate 221. The same resist layer 222 is also provided on the other side of the Ni—Ti alloy plate 221.

Figure 34B:
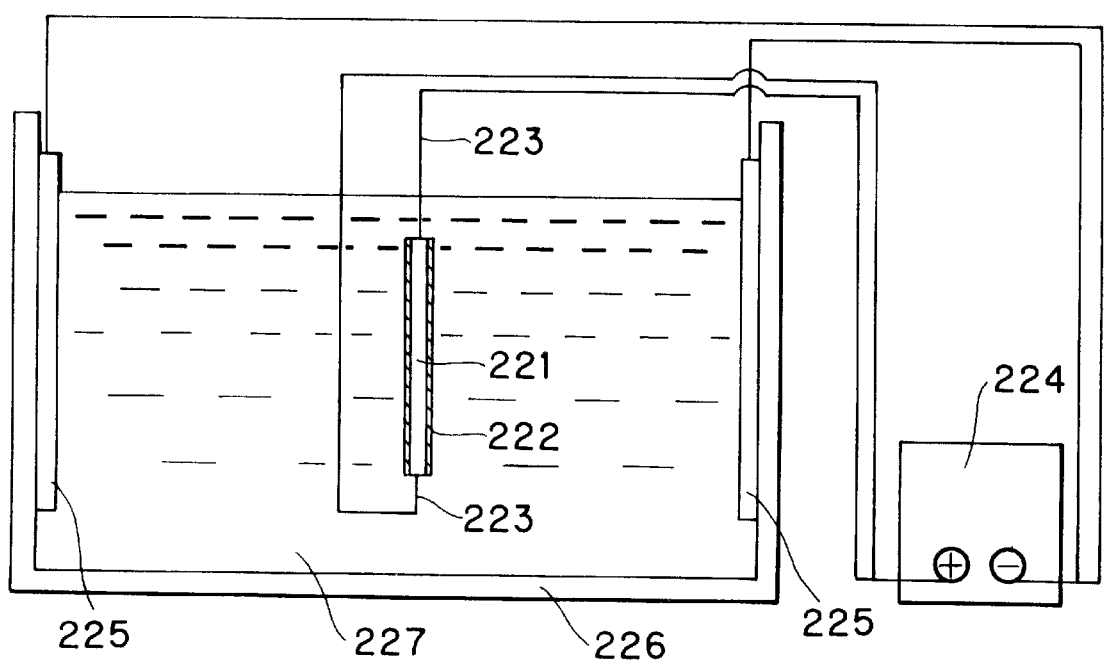
Figure 34C:
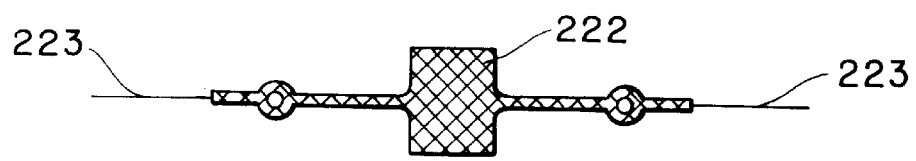

Next, as shown in FIG. 34(b), the Ni—Ti alloy plate 221 thus provided with the resist layer 222 is immersed in a bath 226 containing an electropolishing liquid 227. The lead wires 223 are connected to a direct current power supply 224 so that the Ni—Ti alloy plate 221 operates as an anode. At least two cathode plates 225 are also immersed in the bath 226 in confrontation with the both sides of the Ni—Ti alloy plate 221. The cathode plates 225 are also connected to the direct current power supply 224 to operate as cathodes. The cathode plates 225 are made from platinum or stainless steel. The cathode plates 225 are preferably provided entirely over two confronting side walls of the bath 226. The electropolishing liquid 227 is made of acetic perchlorate solution made of 5% of perchloric acid and 95% of acetic acid. When a predetermined voltage is applied between the Ni—Ti alloy plate 221 and the cathode plates 225, the Ni—Ti alloy plate 221 gradually dissolves into the liquid 227 at the portions where the resist layer 222 is not provided. As a result, as shown in FIG. 34(c), only the portion of the Ni—Ti alloy plate 221, where the resist layer 222 is provided, remains. The applied voltage is in the range of 5 to 30 volts. The shape desired as shown in FIG. 34(c) is obtained within two or three hours when the voltage of 20 volts is applied between the Ni—Ti alloy plate 221 and the cathode plates 225.

Finally, the portions of the Ni—Ti alloy plate 221 defined between the fixing portions 212 and the lead wires 223 are separated from the Ni—Ti alloy plate 221 together with the lead wires 223. Then, the resist layer 222 is removed from the Ni—Ti alloy plate 221, as a result of which the torsion spring 5 is obtained as shown in FIG. 33.

It is noted that the composition of the electropolishing liquid 227 can be freely selected. When required, the electropolishing liquid 227 may be heated in the temperature in the range of 30 to 50 degrees (° C.). In this case, the Ni—Ti alloy plate 221 can be dissolved by the liquid 227 at a higher speed. The electropolishing liquid 227 can be agitated, or the Ni—Ti alloy plate 221 can be rocked, oscillated, or rotated. In this case, the Ni—Ti alloy plate 221 can be dissolved more uniformly. The torsion spring 5 can be produced into a more accurate shape.

The Ni—Ti alloy plate 221 and the cathode plates 225 can be located in the bath 226 in a manner other than that shown in FIG. 34(b). For example, the Ni—Ti alloy plate 221 may be located in a horizontal posture so that the surfaces of the Ni—Ti alloy plate 221 extend in parallel with the liquid surface of the electropolishing liquid 227. The cathode plates 225 may be located in confrontation with the Ni—Ti alloy plate 221. One cathode plate 225 may be located in the vicinity of the bottom of the bath 226, the other being located in the vicinity of the liquid surface of the electropolishing liquid 227.

In the above description, the direct current power supply 224 applies the predetermined fixed amount of voltage between the Ni—Ti alloy plate 221 and the cathode plates 225. However, an electric current of a fixed amount can be supplied to flow between the Ni—Ti alloy plate 221 and the cathode plates 225. When the original Ni—Ti alloy plate 221 has a large area and the torsion spring 5 is desired to have a much smaller area in comparison with the entire Ni—Ti alloy plate 221, it is necessary to dissolve a large part of the Ni—Ti alloy 221. In such a case, the torsion spring 5 can be produced more accurately with the fixed amount of electric current. In this case, the electric current preferably has a density in the range of about 0.5 to about 5 $A/dm^2$. This current condition can be freely selected in accordance with the desired shape and area of the torsion spring 5.

In the above description, the torsion spring 5 is produced through the electropolishing process from the Ni—Ti alloy plate 221. However, the torsion spring 5 can be produced from other various types of shape-memory alloy. The torsion spring 5 can be produced from other various types of material which have elasticity and which have good durability.

As described above, according to the electropolishing process, a thin plate of elasticity is first prepared. Then, a resist layer is provided on the thin plate. The resist layer has a shape corresponding to a planar shape of the torsion spring 5 to be obtained. Then, an electropolishing process is achieved with the thin plate provided with the resist layer so that the thin plate will be dissolved at a portion not provided with the resist layer. The thin plate can be uniformly dissolved at the portion where the resist layer is not provided. The torsion spring 5 can therefore be produced to have a desired shape with high accuracy.

Because the resist layer has a portion corresponding to a magnet holding portion of the torsion spring 5 and a portion corresponding to fixing portions of the torsion spring, the torsion spring 5 can be produced to have the magnet holding portion and the fixing portions to be fixed to the frame 1.

The thin plate is made of a shape-memory alloy. Especially, when thin plate is made of a Ni—Ti alloy, the electropolishing process uses acetic perchlorate solution as electropolishing liquid. Accordingly, the alloy can be uniformly dissolved at the portion where the resist layer is not provided. The torsion spring 5 can therefore be produced to have a desired shape with high accuracy.

In order to assemble the optical scanner 100 with using the above-described torsion spring 5, the magnet 3 is attached to the magnet holding portion 213 via an adhesive agent. Then, the torsion spring 5 is fixed to the frame 1 as shown in FIG. 35 in the same manner as in the first embodiment. Except for the torsion spring 5, the elements of the optical scanner 100 are the same as those in the first embodiment. When the coil 7 is energized to produce an alternating magnetic field with a strength of 3,000 A/m (=300 turns/cm×100 mA) in the same manner as in the first embodiment, the oscillating system 200, comprised of the torsion spring 5 and the magnet 3, angularly oscillates with a resonant frequency of 800 Hz. The oscillating system 200 oscillates with an oscillation width of 50 degrees. Accordingly, the magnet 3 can scan the laser beam with a scanning width of about 100 degrees.

As described already, the oscillation frequency f is proportional to $(k/m)^{1/2}$ where k is the spring modulus of the magnet 3 and m is the mass of the magnet 3. Because "k" is proportional to $T^3$ where T is the thickness of the torsion spring 5 in this case, the frequency f is proportional to $T^{3/2}$. Because the resonant frequency becomes 800 Hz when the thickness T is 200 micrometers, using the torsion spring 5 with the thickness T of 125 micrometers can allow the oscillating system 200 to resonate at about 400 Hz.

In the above-description, the torsion spring 5 is made of Ni—Ti alloy. However, the torsion spring 5 may be comprised of other various shape-memory alloys such as Cu—Zn alloy, Ag—Cd alloy, Au—Cd alloy, Cu—Sn alloy, Cu—Al—Ni alloy, Ni—Al alloy, and Fe—Pt alloy as in the first and second embodiments. The torsion spring 5 may be produced from elastic and durable material other than the shape-memory alloy.

An optical scanner according to a seventh preferred embodiment of the present invention will be described while referring to FIGS. 36 and 37.

In the first through sixth embodiments, the magnet 3 has a mirror-polished surface 3*m* for reflecting off the laser beam. However, in the present embodiment, a magnet is not mirror-polished, but a mirror is prepared separately from the magnet. The torsion spring 5 is sandwitched between the mirror and the magnet, and the mirror and the magnet 3 are connected together.

The present embodiment will be described in greater detail below.

Figure 36:
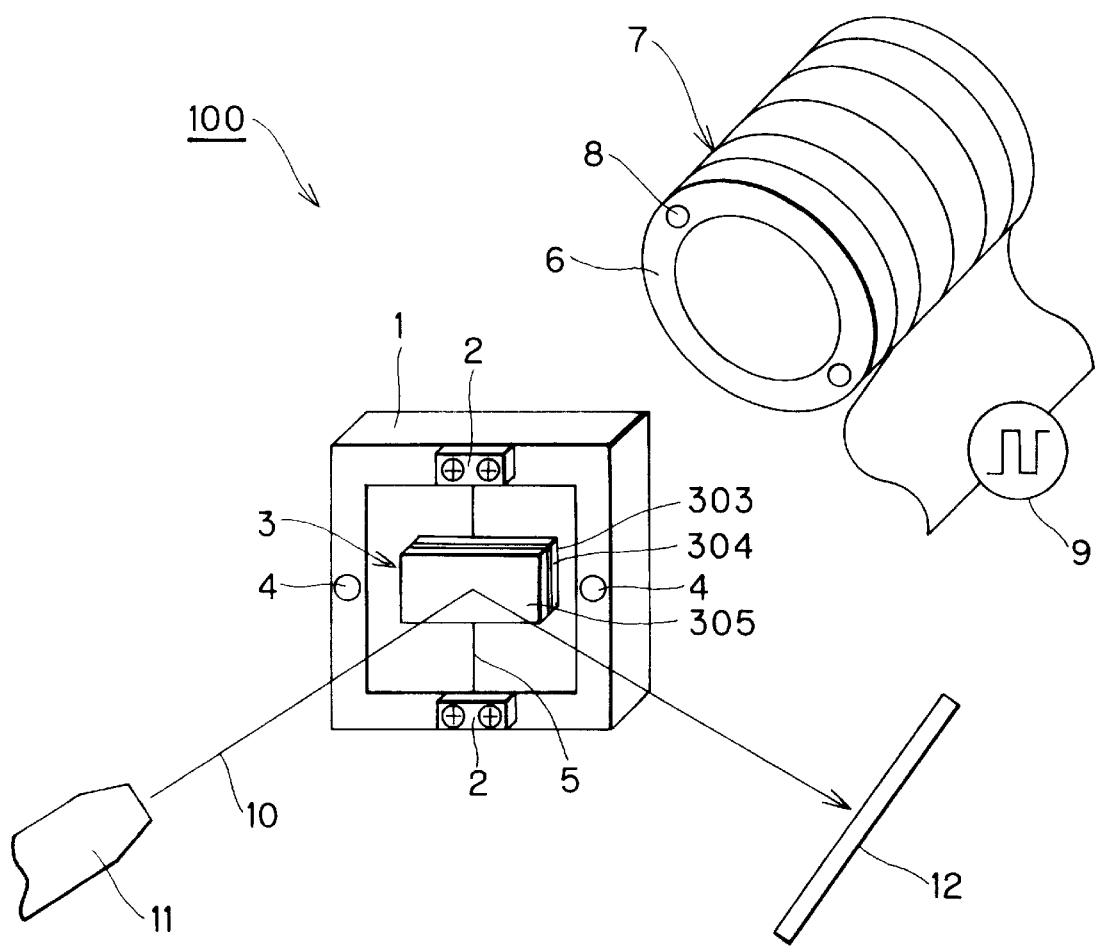
FIG. 36 is a perspective view showing an optical scanner of a seventh embodiment according to the present invention where a frame and a coil are separated from each other.

As shown in FIG. 36, in an optical scanner 100 according to the present embodiment, a plate-shaped magnet 303 and a plate-shaped mirror 305 are prepared separately from each other. The torsion spring 5 made of Ni—Ti alloy is sandwitched between the magnet 303 and the mirror 305. Then, the magnet 303 and the mirror 305 are connected together via a adhesive layer 304 and are assembled into a magnet 3. The adhesive layer 304 may exhibit an adhesive force under the room temperature. For example, the adhesive layer 304 may be a room-temperature set acrylic adhesive agent. Or, the adhesive layer 304 may present an adhesive force when heated. For example, the adhesive layer 304 may be a thermal set epoxy adhesive agent.

Except for the above-described points, the optical scanner 100 of the present embodiment is the same as that of the first embodiment. The optical scanner 100 of the present embodiment operates in the same manner as in the first embodiment.

Figure 37:
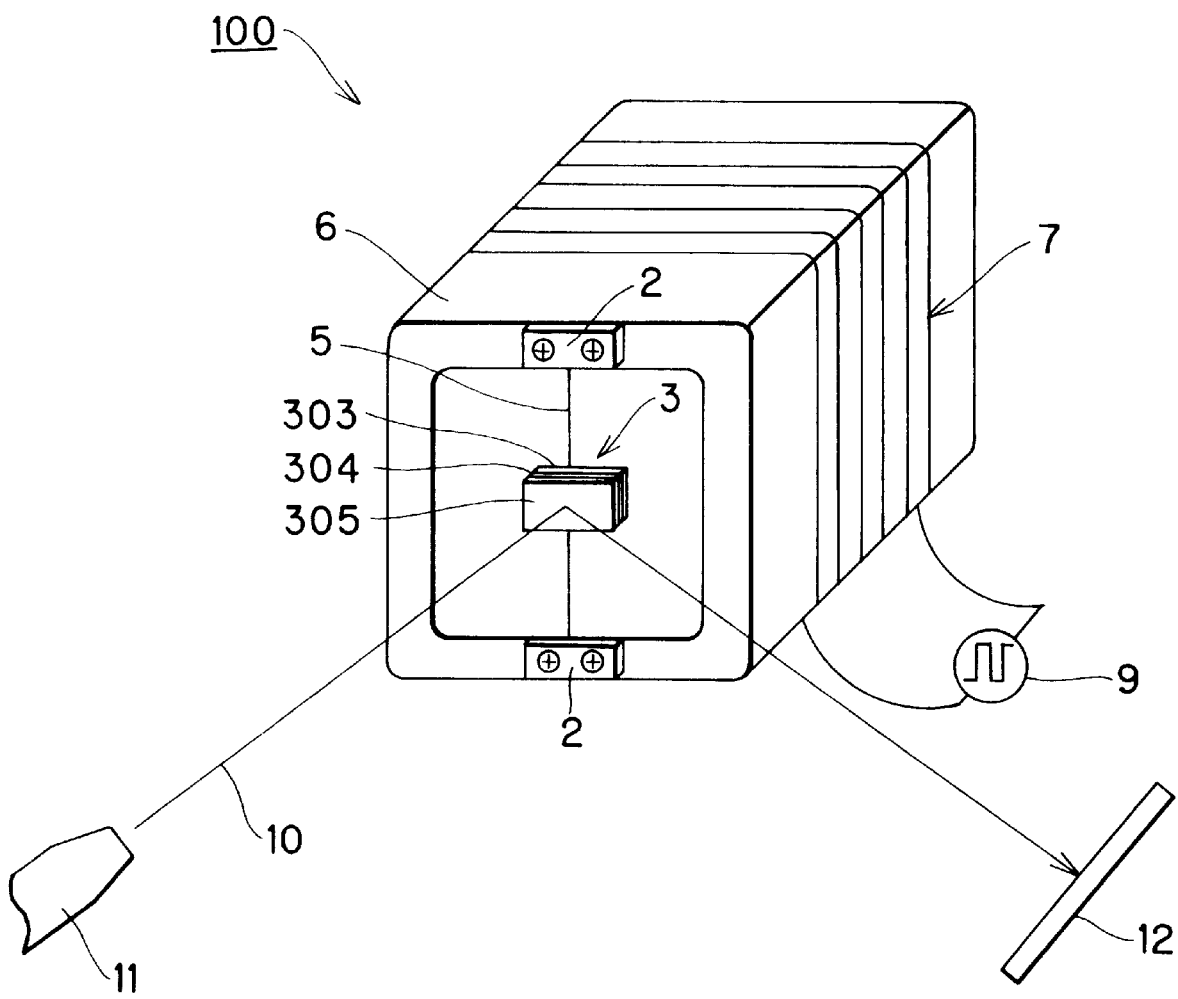
FIG. 37 is a perspective view showing an optical scanner of a modification of the seventh embodiment.

As shown in FIG. 37, the magnet 3 may be directly attached to the core 6 in the same manner as in the fifth embodiment.

The torsion spring 5 may be constructed in the same manner as in the fourth embodiment.

In the above description, the magnet 303 and the mirror 305 are connected via the adhesive layer 304. However, the mirror 305 and the magnet 303 may be connected with several accurate fixing screws.

In the above-description, the torsion spring 5 is made of Ni—Ti alloy. However, the torsion spring 5 may be comprised of other various shape-memory alloys such as Cu—Zn alloy, Ag—Cd alloy, Au—Cd alloy, Cu—Sn alloy, Cu—Al—Ni alloy, Ni—Al alloy, and Fe—Pt alloy as in the first and second embodiments.

According to the present embodiment, the torsion spring 5 can be firmly held between the magnet 303 and the mirror 305 via the adhesive layer 304. The durability of the optical scanner 100 is enhanced. Because it becomes unnecessary to mirror-polish the magnet 3, the optical scanner 100 can be produced more easily.

While the invention has been described in detail with reference to the specific embodiments thereof, it would be apparent to those skilled in the art that various changes and modifications may be made therein without departing from the spirit of the invention.

In the third through seventh embodiments, the torsion spring 5 may not be made from the shape-memory alloy. The torsion spring 5 may be made from an elastic material. In the third through fifth and seventh embodiments, the torsion spring 5 may be formed from an elastic wire. In the sixth embodiment, the torsion spring 5 may be formed from an elastic material. The torsion spring 5 may be made from a material such as a stainless material which has been subjected to a surface treatment, such as a shot peening process, so that its fatigue limit is enhanced and so that the durability of the torsion spring 5 is made reliable.

What is claimed is:

1. An optical scanner for scanning a light beam, the optical scanner comprising:

a magnet member provided with a mirror surface for reflecting off a light beam;

a torsion spring for supporting the magnet member thereon and for being capable of twisting about its axis;

magnetic field generating means for generating an alternating magnetic field, which causes the magnet member to angularly oscillate about the axis of the torsion spring and the torsion spring to twist about the axis, whereby the mirror provided to the magnet member scans the light beam; and a frame for supporting the torsion spring, wherein the torsion spring has both ends along its lengthwise direction, at which the torsion spring is connected to the frame, the torsion spring having a magnet holding portion for holding the magnet member substantially at a central portion along the lengthwise direction, wherein the both ends of the torsion spring have diameters larger than a diameter of the magnet holding portion.

2. An optical scanner as claimed in claim 1, wherein the torsion spring is formed from a material having an elasticity.

3. An optical scanner as claimed in claim 2, wherein the torsion spring is subjected to a surface treatment so as to have an improved fatigue limit.

4. An optical scanner as claimed in claim 2, wherein the torsion spring is made of material with its modulus of elasticity changing according to temperature, further comprising:

temperature changing means for changing temperature of the torsion spring; and temperature control means for controlling the temperature changing means to change the temperature of the torsion spring.

5. An optical scanner as claimed in claim 4, wherein the temperature changing means includes energization means for supplying an electric current to the torsion spring, and wherein the torsion spring is supported by an insulation material portion.

6. An optical scanner as claimed in claim 4, wherein the temperature control means includes:
- a temperature sensor for measuring a temperature of the torsion spring and for outputting a signal indicative of the temperature; and
- driving means for activating the temperature changing means based on the signal.

7. An optical scanner as claimed in claim 4, wherein the temperature control means includes:
- a sensor for measuring either one of an angular position and an angular speed of the mirror provided to the magnet member and for outputting a signal indicative of the measured result; and
- driving means for activating the temperature changing means based on the signal.

8. An optical scanner as claimed in claim 7, wherein the sensor includes a Hall effect sensor.

9. An optical scanner as claimed in claim 7, wherein the sensor includes an optical sensor for detecting the light beam scanned by the magnet member.

10. An optical scanner as claimed in claim 2, wherein the magnet member has a substantially planar surface, and wherein the torsion spring has a substantially planar surface with which the torsion spring is contacted with the magnet member.

11. An optical scanner as claimed in claim 10, wherein the torsion spring is made from a wire having a polygonal cross section at least at a portion where the torsion spring is contacted with the magnet member.

12. An optical scanner as claimed in claim 10, wherein the torsion spring is made from a wire having a flattened oval cross section at least at a portion where the torsion spring is contacted with the magnet member.

13. An optical scanner as claimed in claim 10, wherein the torsion spring is made from a thin plate.

14. An optical scanner as claimed in claim 13, wherein the thin plate has a magnet member holding portion for holding the magnet member thereon, the magnet member holding portion having a width larger than that of a remaining portion of the thin plate.

15. An optical scanner as claimed in claim 14, wherein the torsion spring is produced through electropolishing the thin plate.

16. An optical scanner as claimed in claim 1, wherein the torsion spring is made of an alloy capable of presenting a super elasticity.

17. An optical scanner as claimed in claim 16, wherein the torsion spring is made of a shape-memory alloy.

18. An optical scanner as claimed in claim 17, wherein the torsion spring is applied with a predetermined amount of tension to present an austenitic phase.

19. An optical scanner as claimed in claim 17, wherein the torsion spring is made of a shape-memory alloy with its reverse transformation point being adjusted lower than a room temperature.

20. An optical scanner as claimed in claim 17, wherein the torsion spring is applied with a predetermined amount of tension to present a stress-induced martensitic phase.

21. An optical scanner as claimed in claim 1, wherein the torsion spring is made of a shape-memory alloy.

22. An optical scanner as claimed in claim 21, wherein the torsion spring is made of a shape-memory alloy with its reverse transformation point being adjusted higher than a room temperature.

23. An optical scanner as claimed in claim 21, wherein the torsion spring is applied with a predetermined amount of tension for inducing a martensitic phase in the torsion spring.

24. An optical scanner as claimed in claim 1, wherein the magnet member is constructed from a magnet and a mirror, between which the torsion spring is sandwitched.

25. An optical scanner as claimed in claim 24, wherein the magnet and the mirror are connected with each other via an adhesive layer and assembled together into the magnet member.

26. An optical scanner as claimed in claim 1, wherein the diameter of the torsion spring increases gradually from the magnet holding portion to the both ends.

27. An optical scanner as claimed in claim 1, wherein the torsion spring is subjected to an electroless plating.

28. An optical scanner as claimed in claim 1, wherein the magnetic field generating means includes:
- a coil constructed from an electric wire surrounded around a core member; and
- an electric power supply for supplying the coil with a predetermined amount of alternating electric current having a rectangular waveform.

29. An optical scanner as claimed in claim 28, wherein the torsion spring has both ends along its lengthwise direction, at which the torsion spring is connected to the core, the torsion spring having a magnet holding portion for holding the magnet member substantially at central portion along the lengthwise direction.

30. An optical scanner as claimed in claim 29, wherein the both ends of the torsion spring have diameters larger than a diameter of the magnet holding portion.

31. An optical scanner as claimed in claim 1, wherein the magnetic field generating means is detachably provided to the frame.

32. An optical scanner as claimed in claim 1, wherein the torsion spring is made from a Ni—Ti alloy.

33. An optical scanner as claimed in claim 1, wherein the torsion spring is made from a Cu—Zn alloy.

34. An optical scanner as claimed in claim 1, wherein the torsion spring is made from a material selected from a group consisting of Ni—Ti alloy, Cu—Zn alloy, Ag—Cd alloy, Au—Cd alloy, Cu—Sn alloy, Cu—Al—Ni alloy, Ni—Al alloy, and Fe—Pt alloy.

35. An optical scanner as claimed in claim 1, further comprising a light source for emitting the light beam.

* * * * *